(12) United States Patent
Takeda

(10) Patent No.: US 7,912,460 B2
(45) Date of Patent: Mar. 22, 2011

(54) COMMUNICATION CONTROL SYSTEM FOR PROVIDING SERVICE BY USING POLICY

(75) Inventor: Yukiko Takeda, Tokorozawa (JP)

(73) Assignee: Hitachi, Ltd., Tokyo (JP)

( * ) Notice: Subject to any disclaimer, the term of this patent is extended or adjusted under 35 U.S.C. 154(b) by 595 days.

(21) Appl. No.: 12/037,472

(22) Filed: Feb. 26, 2008

(65) Prior Publication Data

US 2009/0017815 A1    Jan. 15, 2009

(30) Foreign Application Priority Data

Jul. 11, 2007  (JP) ................................. 2007-182012

(51) Int. Cl.
*H04W 4/00* (2009.01)
(52) U.S. Cl. .................. 455/422.1; 455/428; 455/432.3; 455/424; 370/400
(58) Field of Classification Search ............... 455/422.1, 455/432.3, 428, 424, 435.1, 560; 370/400–401, 370/328, 353, 395.52
See application file for complete search history.

(56) References Cited

U.S. PATENT DOCUMENTS

| 7,391,724 | B2 * | 6/2008 | Alakoski et al. ............... 370/230 |
| 2004/0223602 | A1 * | 11/2004 | Honkasalo et al. ........... 379/243 |
| 2007/0049314 | A1 * | 3/2007 | Balachandran et al. ....... 455/518 |

OTHER PUBLICATIONS

"3 GPP2 X.P0013-004-A-A v1.0, All-IP Core Network Multimedia Domain §4.6", (online) Dec. 2005.
RFC3261, Rosenberg et al, "SIP:Session Initiation Protocol §4", Jun. 2002.

* cited by examiner

*Primary Examiner* — Kamran Afshar
(74) *Attorney, Agent, or Firm* — Mattingly & Malur, P.C.

(57) ABSTRACT

A communication system comprising: terminal devices; a gateway device; a first server for receiving a service request; a second server for providing service; and a resource control device for providing policy information to be applied to the service. The first server transmits a policy request including the obtained flow information identifier and the obtained subscriber identifier to the resource control device and transmits identification information of the resource control device to the gateway device. The resource control device transmits the retrieved policy information to the gateway device based on the obtained flow information identifier and the obtained subscriber information. The gateway device receives the policy information from the resource control device corresponding to the resource control device, and sets the received policy information with respect to the service. The second server provides the service which has the policy information set thereto, to the one of the plurality of terminal devices.

18 Claims, 17 Drawing Sheets

210 AS INFORMATION MANAGEMENT TABLE (RESOURCE CONTROL DEVICE)

| AS Address | AS Type | Necessity of Authentication | |
|---|---|---|---|
| p-cscf#5a | IMS | unnecessary | ~210-1 |
| cnt#4 | non IMS | necessary | ~210-2 |
| | | | ~210-n |

230 QoS INFORMATION MANAGEMENT TABLE (RESOURCE CONTROL DEVICE)

| Flow ID | Source IP address | Source Port | QoS Class | Dest. IP address | Dest. Port | Expires | |
|---|---|---|---|---|---|---|---|
| 1234 | Cnt # 4 | 4004 | high | ue1 | 6002 | 2007/11/22 12:34 | ~230-1 |
| | | | | | | | ~230-2 |
| | | | | | | | ~230-n |

850 QoS Class TABLE (RESOURCE CONTROL DEVICE)

| media | QoS Class | |
|---|---|---|
| audio | high | |
| | | |
| | | |

220 QoS INFORMATION MANAGEMENT TABLE (AGW)

| Flow ID | Source IP Address | Source Port | QoS Class | On/Off | Dest. IP Address | Dest. Port | Resource Control Device | AS Address | |
|---|---|---|---|---|---|---|---|---|---|
| 1234 | cnt#4 | 4004 | high | on | ue | 6002 | | | ~220-1 |
| | | | | | | | | | ~220-2 |
| | | | | | | | | | ~220-n |

FIG. 6A

240 SERVICE INFORMATION MANAGEMENT TABLE (CONTROL SERVER)

| AS Address | AGW IP Address | Flow ID | Expires | |
|---|---|---|---|---|
| Cnt # 4 | Agw # 6 | 1234 | 2011/01/01 12 : 34 | ~240-1 |
| | | | | ~240-2 |
| | | | | ~240-n |

FIG. 6B

COMMUNICATION CONTROL SYSTEM FOR PROVIDING SERVICE BY USING POLICY

CLAIM OF PRIORITY

The present application claims priority from Japanese patent application JP 2007-182012 filed on Jul. 11, 2007, the content of which is hereby incorporated by reference into this application.

BACKGROUND OF THE INVENTION

This invention relates to a communication device connected to a network, a communication system, and a communication control method, and more particularly, to a service-basis communication control method for a communication system adopting a protocol other than SIP, the communication system having a resource control device applied thereto.

The third generation mobile communication system is aimed to offer various multimedia services so as to provide, for example, voice, data, and moving image, of high quality at high speed. The 3rd Generation Partnership Project (3GPP) and the 3rd Generation Partnership Project 2 (3GPP2) are promoting standardization of "all IP-based mobile communication network" in order to provide multimedia service using an internet protocol (IP) technology on a packet switched network. The all IP-based mobile communication network is referred to, according to 3GPP, as IP multimedia subsystem (IMS), which is also referred to as multimedia domain (MMD) according to 3GPP2.

IMS relates to a technological specification of session control system which has been studied for establishing an all IP-based mobile communication network. According to IMS, a reference point is defined between the control network system and the transport network system, and the system is independent of the access network system. Accordingly, IMS is adopted into a session control technology in the next generation network (NGN).

According to IMS, session control is performed by a call state control function (CSCF), and subscriber information is held by a home subscriber server (HSS). Further, an application server (AP) provides an application.

According to the technology disclosed in "3GPP2 X. S0013-004-A v1.0, All-IP Core Network Multimedia Domain §4.6" (online), December 2005 (hereinafter, referred to as Non-patent Document 1), CSCF is broadly divided into three categories (P-CSCF, I-CSCF, and S-CSCF) according to the function thereof. P-CSCF (Proxy-CSCF) is accessed by a mobile terminal. I-CSCF (Interrogating-CSCF) specifies the S-CSCF of a mobile terminal. S-CSCF (Serving-CSCF) controls and manages a session state.

According to the technology disclosed in IETF RFC3261, "SIP: Session Initiation Protocol §4", June 2002 (hereinafter, referred to as Non-patent Document 2), the session initiation protocol (SIP) is used as a session control protocol. SIP is a protocol for controlling a session of IP multimedia communication specified by IETF. An example of service using SIP is represented by voice over IP (VoIP). VoIP relates to a technology of transmitting and receiving voice information over an IP network. According to VoIP communication based on SIP, a virtual communication path (session) is set among communication devices before communication is started. Voice data formed into an IP packet is transferred over the set communication path. In the VoIP communication, SIP controls establishment, maintenance, and disconnection of a session among the communication devices.

Media information such as voice data is determined upon establishment of a session. The communication device notifies the media information based on session description protocol (SDP) included in an SIP message. According to SDP, it is possible to describe various information items (such as, for example, an IP address, a port number, and a media type) which relate to a session.

Further, 3GPP, 3GPP2, and NGN are studying a policy control mechanism on a service-by-service basis. In relation thereto, an outline of an operation for performing policy rule control when a session is established. Upon establishing an SIP session, CSCF and policy and charging rules function (PCRF) operate in association with each other, to thereby determine a policy for service which uses SIP protocol. PCRF notifies a policy determined as an access gateway (AGW, for example, PDSN). Then, the AGW applies the policy on a service-by-service basis.

SUMMARY OF THE INVENTION

According to the conventional communication system, the service-based policy control mechanism is not provided when the system provides non-IMS application service. Accordingly, AGW cannot perform control (such as bandwidth control, priority control, and control of opening and closing of a port) based on various service information.

For example, the non-IMS application service includes multicast service to be provided to a plurality of mobile terminals (for example, broadcast multicast service (BC-MCS) of 3GPP2). A conventional method of activating BCMCS is as follows.

First, a terminal transmits a BCMCS request to a BCMCS control server. The BCMCS control server, which has received the BCMCS request, transmits a BCMCS request response to the terminal. Conventionally, the BCMCS request and the BCMCS request response pass through AGW, but resource reception control has not been performed in AGW. Accordingly, there has been a problem that AGW cannot perform control with respect to BCMCS based on service information.

This invention has been made in view of the above-mentioned problem, and it is an object of this invention to perform control based on service information even in a case of providing non-IMS service. In particular, this invention has an object to provide a communication method for enabling policy control based on service information in a communication network using IP.

A representative aspect of this invention is as follows. That is, there is provided a communication system comprising: a plurality of terminal devices; a gateway device for connecting the plurality of terminal devices to a network; a first server for receiving a service request from one of the plurality of terminal devices; a second server for providing service to the one of the plurality of terminal devices; and a resource control device for providing policy information to be applied to the service provided from the second server. The first server manages service control information for associating the service with the policy information, obtains a flow information identifier and a subscriber identifier from a service activation request message received from the one of the plurality of terminal devices, transmits a policy request message including the obtained flow information identifier and the obtained subscriber identifier to the resource control device based on an instruction from the second server, and transmits identification information of the resource control device to the gateway device based on a response message received from the resource control device. The resource control device manages resource control information for associating the flow information identifier with the policy information, obtains the flow information identifier and the subscriber identifier from the policy request message transmitted from the first server, retrieves policy information based on the obtained flow information identifier and the obtained subscriber information, the policy information including QoS information to be applied to the service, and transmits the retrieved policy information to the gateway device. The gateway device receives the identification information of the resource control device from the first server, receives the policy information from the resource control device corresponding to the received identification information, and sets the received policy information with respect to the service. The second server provides the service which has the policy information set thereto, to the one of the plurality of terminal devices.

According to an embodiment of the present invention, it is possible to perform control (such as bandwidth control, priority control, and control of opening and closing of a port) based on service information even in a case of providing application service using a protocol other than SIP. In other words, it is possible to perform control based on service information in a case of providing non-IMS service.

BRIEF DESCRIPTION OF THE DRAWINGS

The present invention can be appreciated by the description which follows in conjunction with the following figures, wherein:

FIG. 4A is am explanatory diagram showing an AS information management table in accordance with the first embodiment of this invention;

FIG. 4B is am explanatory diagram showing a QoS information management table in accordance with the first embodiment of this invention.

FIG. 4C is am explanatory diagram showing a QoS Class table in accordance with the first embodiment of this invention;

FIG. 6A is am explanatory diagram showing a QoS information management table in accordance with the first embodiment of this invention;

FIG. 6B is am explanatory diagram showing a service information management table in accordance with the first embodiment of this invention.

DETAILED DESCRIPTION OF THE PREFERRED EMBODIMENTS

First Embodiment

A description will be given of a first embodiment of this invention with reference to the accompanying drawings.

Based on the first embodiment of this invention, a description will be given of a communication method for a case where a mobile terminal uses a BCMCS application.

Figure 1:
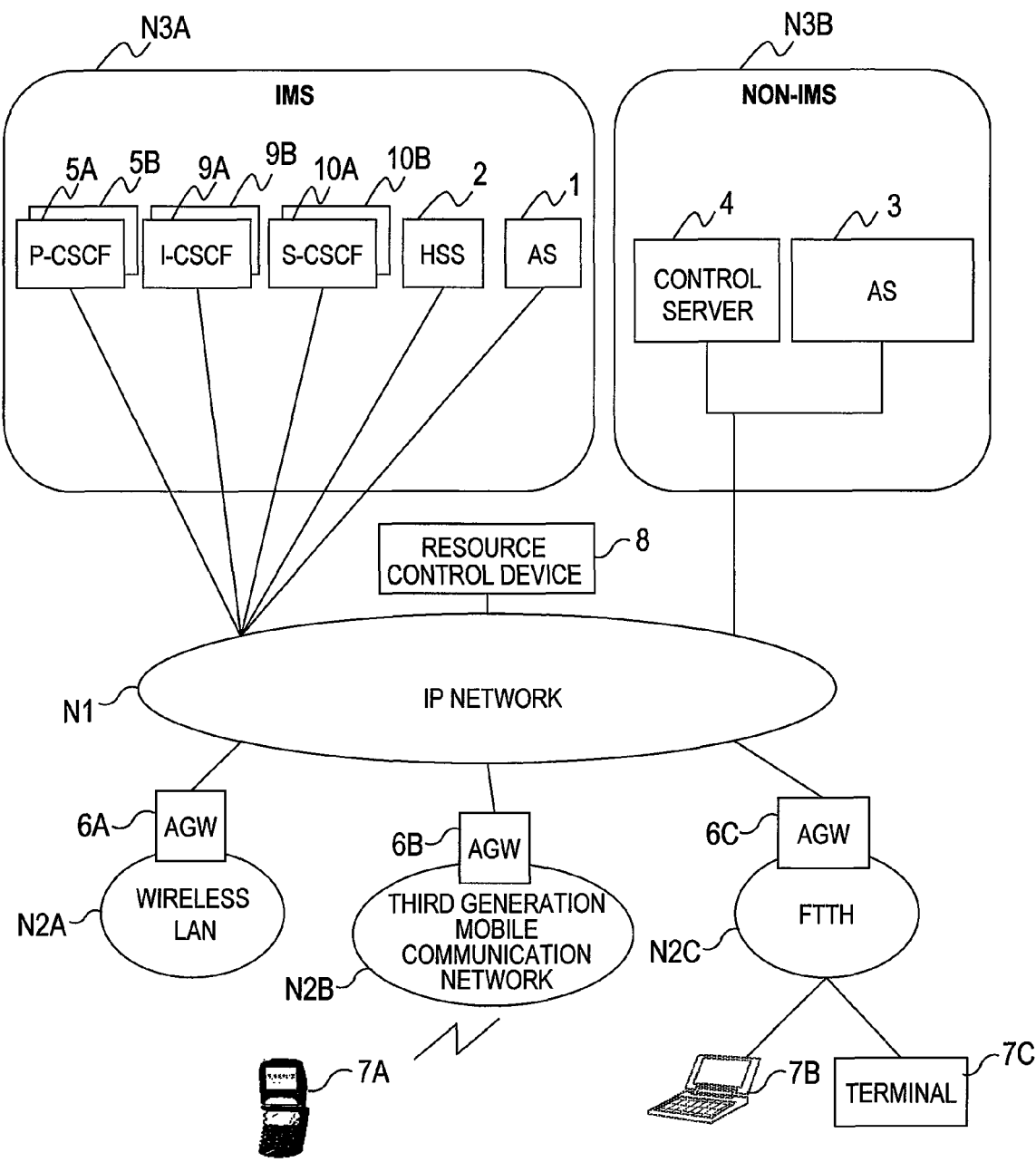
FIG. 1 is a configuration diagram showing a communication network in accordance with a first embodiment of this invention.

FIG. 1 is a configuration diagram of a communication network according to the first embodiment of this invention.

The communication network according to the first embodiment of this invention includes an IP network N1 and an access network N2 (N2A, N2B, or N2C).

The IP network N1 has a server group N3A, a server group N3B, and a resource control device 8 connected thereto.

The server group N3A provides IMS service. Also, the server group N3A includes an AS 1, an HSS 2, an S-CSCF 10 (10A or 10B), an I-CSCF 9 (9A or 9B), and a P-CSCF 5 (5A or 5B).

The AS 1 is an application server for controlling the execution of an IMS application (SIP application).

The HSS 2 holds subscriber information. The subscriber information includes, for example, authentication information of a UE 7, and application information which the UE 7 subscribes. It should be noted that the subscriber information is referred to in order to determine whether each UE 7 is allowed to receive service to be provided by the AS 1.

The P-CSCF 5, the I-CSCF 9, and the S-CSCF 10 each are a server provided with a session control function. The P-CSCF 5 is a CSCF server which the UE 7 accesses first. The I-CSCF 9 is a server for specifying the S-CSCF 10 to be used by the UE 7. The S-CSCF 10 is a server for controlling and managing the session state of the UE 7.

It should be noted that the numbers of the S-CSCF 10, the I-CSCF 9, and the P-CSCF 5 shown in FIG. 1 are all set, by way of example, to two. However, the numbers of those constituent elements may be arbitrary. Also, the S-CSCF 3, the AS 1, and the HSS 2 may be implemented by the same device. Further, the S-CSCF 3, the I-CSCF 4, and the P-CSCF 5 may be implemented by the same device.

The server group N3B includes an AS 3 and a control server 4.

The AS 3 (for example, a contents server) is a server for controlling the execution of a non-IMS application. The control server 4 is a server for controlling the AS 3. It should be noted that the control server 4 and the AS 3 may be implemented by the same communication device.

The resource control device 8 is a device for setting policy information with respect to service. The resource control device 8 may be implemented by the same device as an AGW 6.

The IP network 1 and the access network N2 are connected to each other through the access gateway device (AGW) 6 (6A, 6B, or 6C). The AGW 6 transfers an IP packet transmitted and received between a terminal 7 and the IP network N1. It should be noted that the IP network 1 and the access network N2 may also be connected to each other via another communication device such as a router, in place of the AGW 6.

The access network N2 includes, for example, a wireless LAN (N2A), a third generation mobile communication network (N2B), and an FTTH (N2C). FIG. 1 also shows a fixed terminal (7B or 7C) and a mobile terminal (7A), as examples of the terminal (hereinafter, referred to as user equipment: UE) 7 accessing the access network N2.

Figure 2:
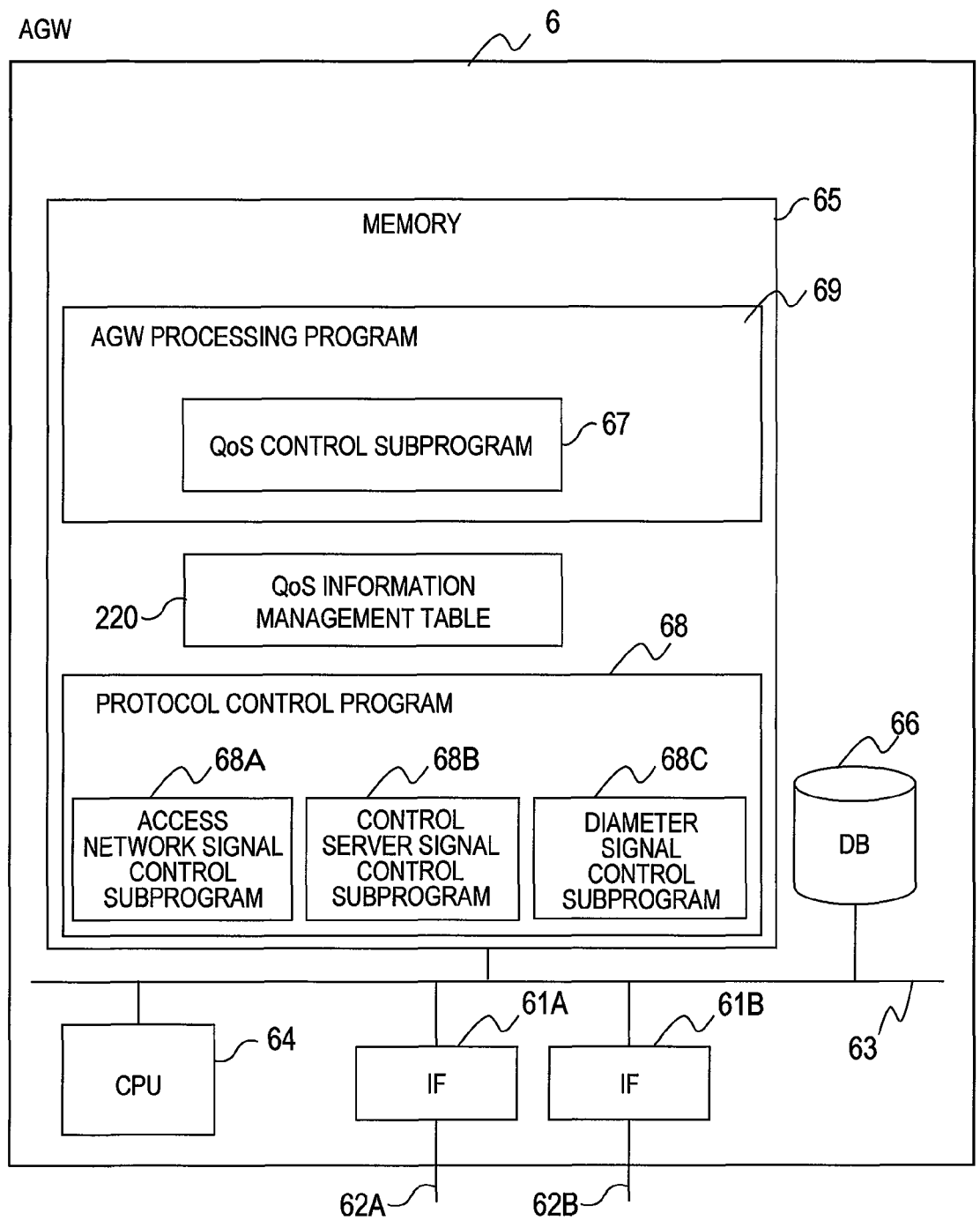
FIG. 2 is a configuration diagram showing an AGW in accordance with the first embodiment of this invention.

FIG. 2 is a configuration diagram of the AGW 6 according to the first embodiment of this invention.

The AGW 6 includes an IF 61 (61A or 61B), a CPU 64, a memory 65, and a database (DB) 66. Each of the constituent elements is connected to a bus 63.

The IF 61 is an interface connected to a line 62 (62A or 62B).

The CPU 64 is a processor for executing programs stored in the memory 65. The CPU 64 executes any one of the programs, whereby the process executed by the AGW 6 is implemented.

The memory 65 stores an AGW processing program 69, a protocol control program 68, and a QoS information management table 220. The memory 65 may also store another program.

The AGW processing program 69 includes a QoS control subprogram 67. The QoS control subprogram 67 refers to the policy information or updates the policy information.

The protocol control program 68 includes an access network signal control subprogram 68A, a control server signal control subprogram 68B, and a DIAMETER signal control subprogram 68C.

The access network signal control subprogram 68A relates to a process in which the AGW 6 transmits or receives a signal with respect to a communication device existing on the IP network N1. The control server signal control subprogram 68B relates to a process in which the AGW 6 transmits or receives a signal with respect to the control server 4. The DIAMETER signal control subprogram 68C relates to a process in which the AGW 6 transmits or receives a signal with respect to the resource control device 8.

The QoS information management table 220 stores policy information of the UE 7. The QoS information management table 220 will be described later in detail with reference to FIG. 6A.

The DB 66 is a database for storing various information items. The DB 66 may also include the QoS information management table 220.

The AGW 6 uses the QoS control subprogram 67 and the QoS information management table 220, to thereby perform policy control on an application basis.

FIG. 6A shows the QoS information management table 220 according to the first embodiment of this invention. In a case of registering policy control information corresponding to the service requested by the UE 7, the AGW 6 refers to the QoS information management table 220 and updates the QoS information management table 220.

The QoS information management table 220 includes a Flow ID 221, a Source IP Address 222, a Source Port 223, a QoS Class 224, an On/Off 225, a Destination (Dest.) IP Address 226, a Destination (Dest.) Port 227, a Resource Control Device 228, and an AS Address 229.

The Flow ID 221 includes an identifier of multicast information. The Source IP Address 222 includes an IP address of the transmission source AS 3. The Source Port 223 includes a port number of the transmission source AS 3. The QoS Class 224 includes information on class for categorizing the type of QoS. The On/Off 225 includes information for determining whether or not to perform QoS management. The Dest. IP Address 226 includes the IP address of a destination terminal. The Dest. Port 227 includes the port number of the destination terminal. The Resource Control Device 228 includes the IP address of the resource control device 8. The AS Address 229 includes the IP address of the AS 3.

It should be noted that, because the QoS information management table 220 includes the Resource Control Device information 228 and the AS Address 229, in a case where the link between the UE 7 and the AGW 6 is disconnected, it is possible to inform the resource control device 8 and the control server 4 of the AS 3 of the disconnection of the link, and to update information on the resource control device 8 and on the control server 4.

Figure 3:
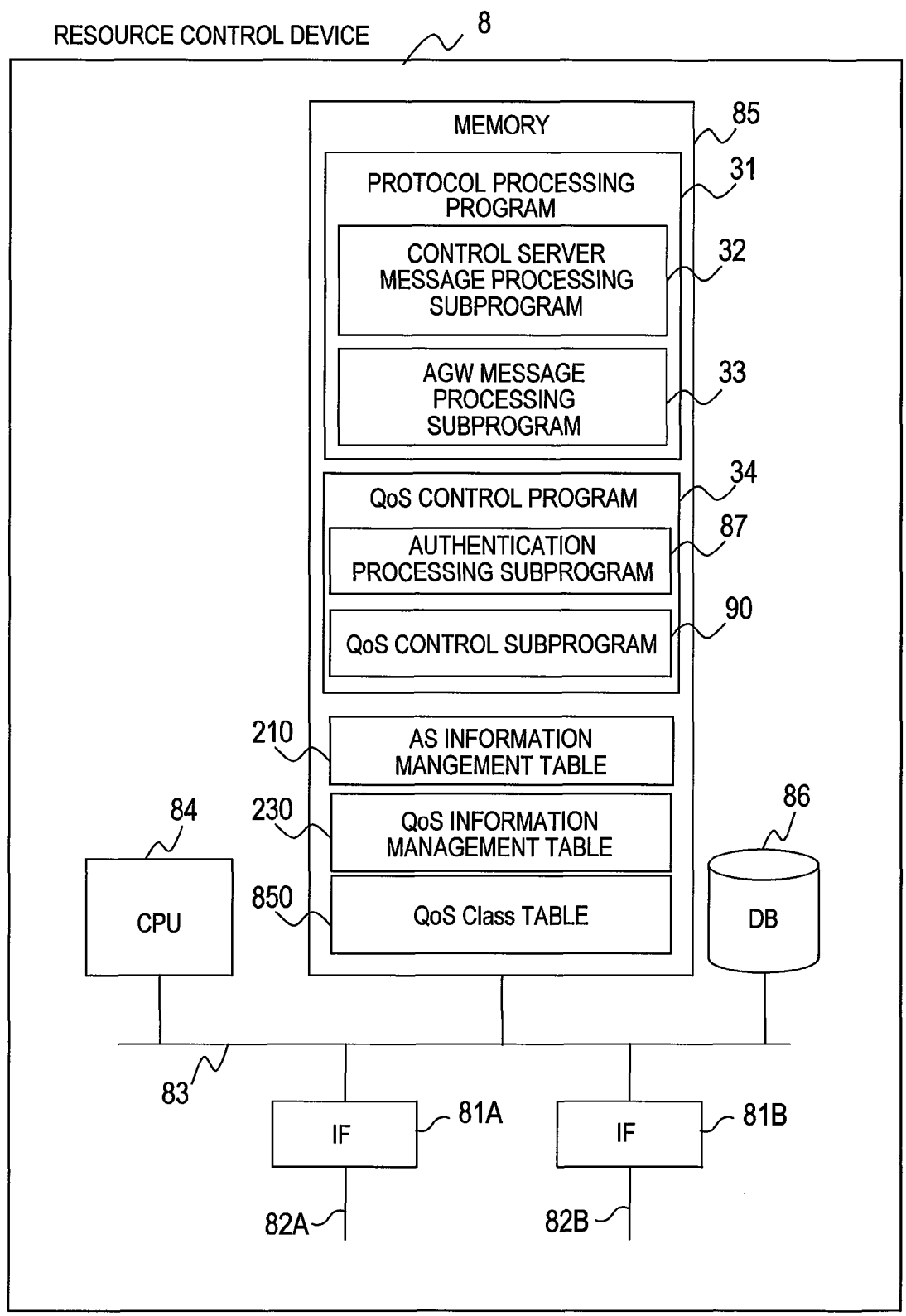
FIG. 3 is a configuration diagram showing a resource control device in accordance with the first embodiment of this invention.

FIG. 3 is a configuration diagram of the resource control device 8 according to the first embodiment of this invention.

The resource control device 8 includes the IF 81 (81A or 81B), a CPU 84, a memory 85, and a DB 86. Each of the constituent elements is connected to a bus 83.

The IF 81 is an interface connected to a line 82 (82A or 82B). The CPU 84 is a processor for executing programs stored in the memory 85. The CPU 84 executes any one of the programs, whereby the process to be executed by the resource control device 8 is implemented.

The memory 85 stores a protocol processing program 31, a QoS control program 34, an AS information management table 210, a QoS information management table 230, and a QoS Class table 850. The memory 85 may also store another program.

The protocol processing program 31 includes a control server message processing subprogram 32 and an AGW message processing subprogram 33.

The control server message processing subprogram 32 relates to a process of transmitting or receiving a signal with respect to a control server 4 existing on the IP network N3. The AGW message processing subprogram 33 relates to a process of transmitting and receiving a signal (for example, DIAMETER) with respect to the AGW 6 connected to the IP network N1.

The QoS control program 34 includes an authentication processing subprogram 87 and a QoS control subprogram 90.

The authentication processing subprogram 87 authenticates a transmission source requesting policy control. The QoS control subprogram 90 refers to or updates the policy information.

The AS information management table 210 stores information concerning to an application server on the IP network N3. The QoS information management table 230 stores policy information of the UE 7. The QoS Class table 850 holds relation between an application and QoS. It should be noted that the AS information management table 210, the QoS information management table 230, and the QoS Class table 850 will be described later in detail with reference to FIG. 4.

The DB 86 is a database storing various information items. The DB 86 may also include the AS information management table 210, the QoS information management table 230, and the QoS Class table 850.

The resource control device 8 uses the QoS control subprogram 90, the QoS information management table 230, and the QoS Class table 850, to thereby perform policy control on an application basis. Further, the resource control device 8 uses the authentication processing subprogram 87 and the AS information management table 210, to thereby check the validity of a transmission source requesting the policy control.

Further, the resource control device 8 may manage a ratio between IMS resources and non-IMS resources, and a usage state of each of the resources, to thereby provide a cooperation function between the IMS resources and the non-IMS resources. The system makes it possible, for example, to secure a large amount of resources as the IMS resources, and to perform a process of preferentially allocating the resources for the IMS in a case of running short of the resources.

FIG. 4A shows the AS information management table 210 according to the first embodiment of this invention.

The AS information management table 210 includes an AS Address 211, an AS Type 212, and a Necessity of Authentication 213.

The AS Address 211 includes an IP address of an application server. The AS Type 212 includes information indicating whether the application server is IMS or non-IMS. The Necessity of Authentication 213 includes information indicating whether it is necessary or not to authenticate a transmission source application server requesting policy control.

The resource control device 8, upon receiving a policy control request corresponding to the service from the AS (1 or 3), refers to the AS information management table 210 in order to determine whether it is necessary or not to authenticate the transmission source which has requested the policy control. The AS information management table 210 at least stores the AS Type 212 and the Necessity of Authentication 213 in association with the AS Address 211.

Specifically, in the example shown in FIG. 4A, an entry 210-2 has the AS Address 211 storing "cnt#4", the AS Type 212 storing "non IMS", and the Necessity of Authentication 213 storing "necessary", which indicates that the type of the application server identified by "cnt#4" is a non-IMS application server which does not perform SIP-based session control, and that it is necessary to authenticate the transmission source when the resource control device 8 has received a policy control request. In this case, the resource control device 8 executes the authentication processing subprogram 87 with respect to the transmission source requesting policy control.

FIG. 4B shows the QoS information management table 230 according to the first embodiment of this invention.

The QoS information management table 230 includes a Flow ID 231, a Source IP address 232, a Source Port 233, a QoS Class 234, a Dest. IP address 235, a Dest. Port 236, and an Expires 237.

The Flow ID 231 includes an identifier of multicast information. The Source IP address 232 includes an IP address of the transmission source AS 3. The Source Port 233 includes a port number of the transmission source AS 3. The QoS Class 234 includes information on a class for categorizing the type of QoS type. The Dest. IP address 235 includes an IP address of a terminal of destination. The Dest. Port 236 includes a port number of the terminal of destination. The Expires 237 includes information on the expiry date of the entry.

The resource control device 8, upon receiving a policy control request corresponding to the service from the AS (1 or 3), refers to the QoS information management table 230, and updates the QoS information management table 230. The QoS information management table 230 at least stores the Source IP address 232, the QoS Class 234, and the Dest. IP address 235 in association with the Flow ID 231. Further, in the case where the QoS information management table 230 includes the Source Port 233 and the Dest. Port 236, the resource control device 8 can perform resource control by using the transmitting and receiving addresses and the transmitting and receiving port numbers. Also, the resource control device 8 may delete an expired entry.

FIG. 4C shows the QoS Class table 850 according to the first embodiment of this invention.

The QoS Class table 850 includes a media 851 and a QoS Class 852.

The media 851 includes information indicating a type of service of the application. The QoS Class 852 includes information on class for categorizing the type of QoS.

The resource control device 8, upon receiving a policy control request corresponding to the service from the AS (1 or 3), refers to the QoS Class table 850 in order to specify the QoS class corresponding to the service. The QoS Class table 850 at least stores the QoS Class 852 in association with the media 851.

Figure 5:
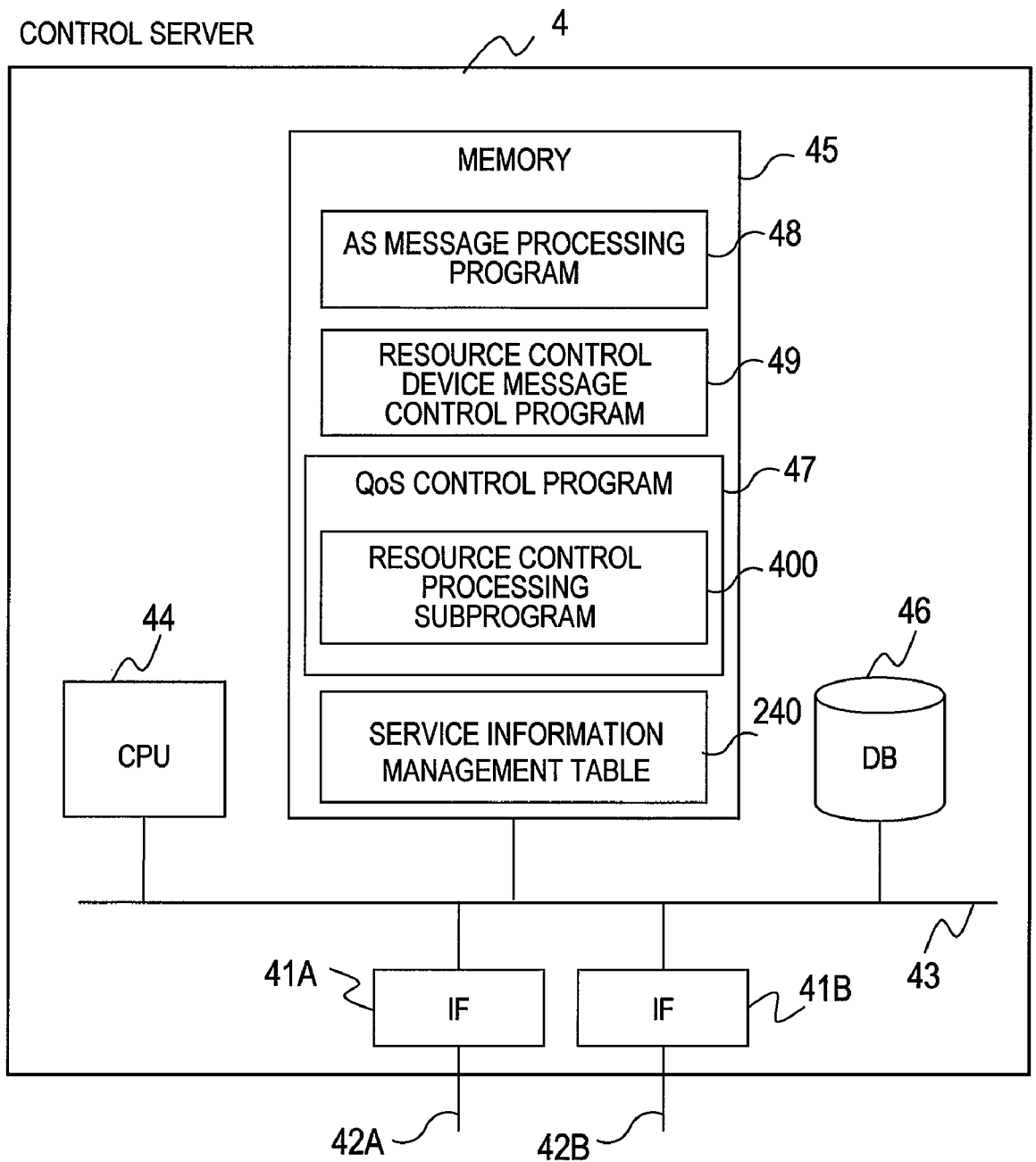
FIG. 5 is a configuration diagram showing a control server in accordance with the first embodiment of this invention.

FIG. 5 is a configuration diagram of the control server 4 according to the first embodiment of this invention.

The control server 4 includes an IF 41 (41A or 41B), a CPU 44, a memory 45, and a DB 46. Each of the constituent elements is connected to a bus 43.

The IF 41 is an interface connected to a line 42 (42A or 42B). The CPU 44 is a processor for executing programs stored in the memory 45. The CPU 44 executes any one of the programs to thereby implement the processes executed by the control server 4.

The memory 45 stores an AS message processing program 48, a resource control device message control program 49, a QoS control function program 47, and a service information management table 240. The memory 45 may also store another program.

The AS message processing program 48 relates to a process of transmitting or receiving a signal with respect to the AS 3. The resource control device message control program 49 relates to a process of transmitting or receiving a signal with respect to the resource control device 8.

The QoS control program 47 includes a resource control processing subprogram 400.

The resource control processing subprogram 400 relates to a process of referring to or updating the policy information.

The service information management table 240 stores service information of the UE 7.

The DB 46 is a database for storing various information items. The DB 46 may also include the service information management table 240.

The control server 4 uses the resource control processing subprogram 400 and the service information management table 240, to thereby perform policy control of service when a request for the service is received from a terminal.

FIG. 6B shows the service information management table 240 according to the first embodiment of this invention.

The service information management table 240 includes an AS Address 241, an AGW IP Address 242, a Flow ID 243, and an Expires 244.

The AS Address 241 includes an IP address of the AS 3. The AGW IP Address 242 includes an IP address of the AGW 6. The Flow ID 243 includes an identifier of multicast information. The Expires 244 includes information on the expiry date of the entry. The control server 4 may delete an expired entry.

The control server 4, upon receiving a service request from AGW 6 through BCMCS, refers to the service information management table 240 which holds policy information on a service basis. Also, in a case where there is any change in policy information, the control server 4 updates the service information management table 240. The service information management table 240 at least stores the AGW IP Address 242 and the Flow ID 243 in association with the AS Address 241.

Next, a description will be given of, with reference to FIG. 7, a sequence in which a UE 7A located in the service area of the third generation mobile communication network N2B shown in FIG. 1 makes location registration with the AS 3 (for example, information distribution server) by using BCMCS, and executes multicasting service such as news distribution with respect to the AS 3.

Figure 7:
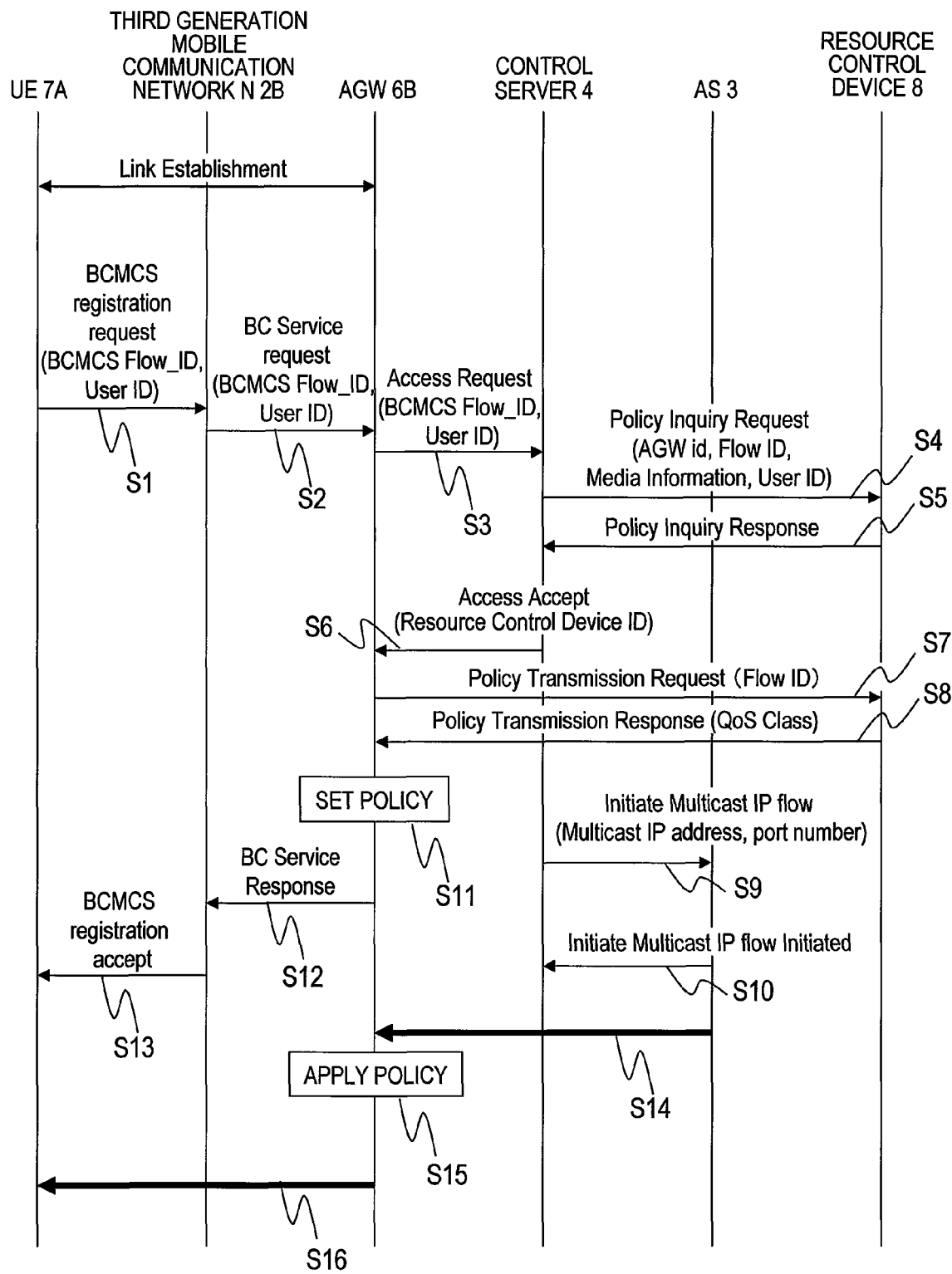
FIG. 7 is a sequence diagram showing a service activation procedure in accordance with the first embodiment of this invention.

FIG. 7 is a sequence diagram for illustrating a service activation procedure according to the first embodiment of this invention.

First, the UE 7A existing on the third generation mobile communication network N2B establishes a link with respect to the AGW 6B. When establishing the link, the UE 7A obtains a DHCP Server address, and obtains the address of the control server 4 from the DHCP Server. Further, the UE 7A obtains an IP address after establishing a link with respect to the AGW 6B. For example, the UE 7A receives an IPv6 router advertisement from the AGW 6B, to thereby obtain the IP address.

According to the first embodiment of this invention, the UE 7A is not a mobile IP terminal, and obtains the IP address (ue#1) in the third generation mobile communication network N2B. It should be noted that in a case where the UE 7A is a mobile IP compatible terminal, the UE 7A uses the address obtained in the third generation mobile communication network N2B as a care-of address of the mobile IP.

Next, in order to request the use of multicasting service, the UE 7A transmits a BCMCS registration request message to the control server 4 which has obtained an address from the DHCP server (S1, S2, S3). Specifically, the UE 7A accesses the third generation mobile communication network N2B (S1), and transmits the BCMCS registration request message to the AGW 6B (S2). Next, the AGW 6B transmits, as the BCMCS registration request message, an Access Request to the control server 4 (S3). It should be note that the BCMCS registration request message at least includes an identifier (Flow ID) of multicast information desired to be received and a user ID.

The control server 4, upon receiving the Access Request, executes the resource control processing subprogram 400. The process to be executed based on the resource control processing subprogram 400 will be described later in detail with reference to FIG. 8.

Next, the control server 4 transmits a policy inquiry request message to the resource control device 8, based on an instruction from the transmission source AS 3, to thereby make a policy inquiry (S4). It should be noted that the policy inquiry request message includes the address (AGW id) of the transmission source which has requested the activation of service, a Flow ID, media information, and a User ID.

The resource control service 8, upon receiving the policy inquiry request message, executes the QoS control subprogram 90. The process to be executed based on the QoS control subprogram 90 will be described later in detail with reference to FIG. 9.

Next, the resource control device 8 transmits a response message with respect to the policy inquiry request message, to the control server 4 (S5). The control server 4, upon receiving the response message from the resource control device 8, transmits the received response message to the AGW 6B (S6).

It should be noted that the response message includes, in addition to the parameter included in the BCMCS registration request message, identification information on the resource control device 8 requesting the policy. The AGW 6B, which has received the identification information on the resource control device 8, is capable of making an inquiry to the resource control device 8 about policy information corresponding to the Flow ID even in a case of providing service without using SIP for session control.

Next, the AGW 6B transmits the policy transmission request message including Flow ID to the resource control device 8, by using the identification information received in S6 (S7). Upon receiving the policy transmission request message, the resource control device 8 searches the QoS information management table 230 by using, as a retrieval key, the Flow ID included in the policy transmission request message. Specifically, the resource control device 8 reads out a QoS class corresponding to the Flow ID, from the entry created by the process performed based on the QoS control subprogram 90.

Next, the resource control device 8 transmits the policy transmission response message, which includes the readout QoS class, to the control server 4 (S8).

Next, the AGW 6B, upon receiving the policy transmission response message including the QoS class, executes the QoS control subprogram 67, and sets a policy based on the received QoS class (S11). The process to be performed based on the QoS control subprogram 67 will be described later in detail with reference to FIG. 11.

Next, the AGW 6B transmits a response with respect to the BCMCS registration request message, to the UE 7A (S13), via the third generation mobile communication network N2B (S12).

Also, the control server 4 transmits a multicast IP flow registration request message to the AS 3 (S9). Then, the AS 3 transmits, upon receiving the multicast IP flow registration request message, a response message to the control server 4 (S10).

When the AGW 6 receives a packet from the AS 3 after setting the policy (S14), the AGW 6 refers to the QoS information management table 220, and implements the policy with respect to the received packet (S15). The packet on which the policy has been implemented is transmitted to the UE 7A (S16).

By following the above-mentioned procedure, it is possible to make an inquiry to the resource control device 8 about policy information to be set to the AGW 6B and to transmit the policy information to the AGW 6B, when the control server 4 has requested the activation of service. Accordingly, even in a case of providing service by using a control procedure other than SIP, the AGW 6B is capable of performing priority control, bandwidth control, or the like on a packet by applying a policy on a service basis.

Also, the IMS N3A and the non-IMS N3B manage user information related to the service, thereby making it possible to associate information related to the resource control with a network configuration managed by the IP network N1 side. When the information related to the resource control is associated with the network configuration managed by the IP network N1 side, the first embodiment of this invention can be applied to a case where a service provider and a network operator are different from each other.

Figure 8:
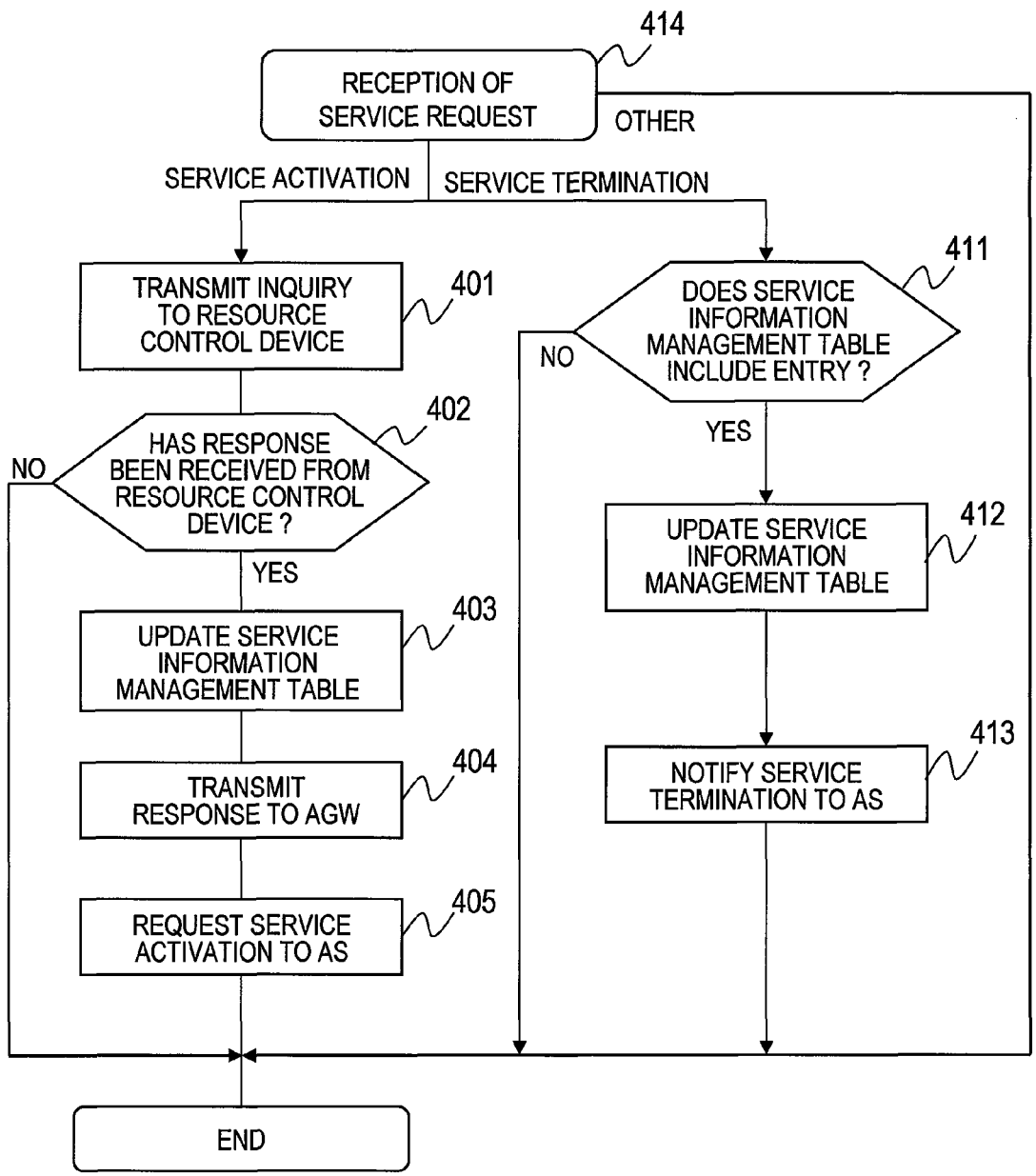
FIG. 8 is a flowchart showing a process executed by a resource control processing subprogram in accordance with the first embodiment of this invention.

FIG. 8 is a flowchart of a process to be performed based on the resource control processing subprogram 400 according to the first embodiment of this invention. The flowchart shows a control procedure for non-IMS access. In the following, BCMCS service will be described as an example of the non- IMS access. Examples of the non-IMS service also includes, other than the BCMCS service, access using HTTP, RTSP used for activating stream service, and an SIP which is not conforming to IMS.

The resource control subprogram 400 is executed when the control server 4 has received a BCMCS registration request message from the AGW 6.

First, the control server 4 identifies whether the received message relates to a service activation request or not (414). Specifically, in the case where the received massage relates to a service activation request (in the case where the Access Request has been received in S3 of FIG. 7 according to the first embodiment of this invention), the control server 4 makes a policy inquiry to the resource control device 8 (401).

Next, the control server 4, in a case where the response message has been normally received from the resource control device 8 (402), searches the service information management table 240 by using, as a retrieval key, the address of AS 3 which is a destination address of the message received from the AGW 6, and updates the contents of the table (403). Specifically, in a case where the table includes an entry corresponding to the AS Address 241, the entry is updated. On the other hand, in a case where the table does not include an entry corresponding to the AS Address 241, a new entry is created. For example, "cnt#4" is set to the AS Address 241. Also, an AGW id (agw#6) included in the BCMCS registration request message is set to the AGW IP Address 242. Further, the Flow ID (1234) included in the BCMCS registration request message is set to the Flow ID 243. On the other hand, in the case where the response message has not been normally received from the resource control device in Step 402, the control server 4 terminates the process.

Next, the control server 4 transmits a response message with respect to the BCMCS registration request message, to the AGW 6 (404).

Next, the control server 4 transmits a service activation request to the AS 3 (405). Specifically, the control server 4 transmits, to the AS 3, a multicast IP flow registration request message and then terminates the process.

In the case where it is identified in Step 414 that the received message includes any other message than the service activation request and the service termination request, the control server 4 terminates the process.

In the case where it is identified in Step 414 that the received message relates to a service termination request, the control server 4 searches the service information management table 240 by using, as a retrieval key, the address of the AS 3 which is a destination address of the message received from the AGW 6 (411). Specifically, in the case where the table includes an entry corresponding to the AS Address 241, the process proceeds to Step 412. On the other hand, in the case where the table does not include an entry corresponding to the AS Address 241, the process is terminated.

Next, the control server 4 deletes the entry corresponding to the address of the AS 3, and updates the service information management table 240 (412).

Next, the control server 4 transmits a service termination notification to the AS 3, to thereby terminate the process (413).

Figure 9:
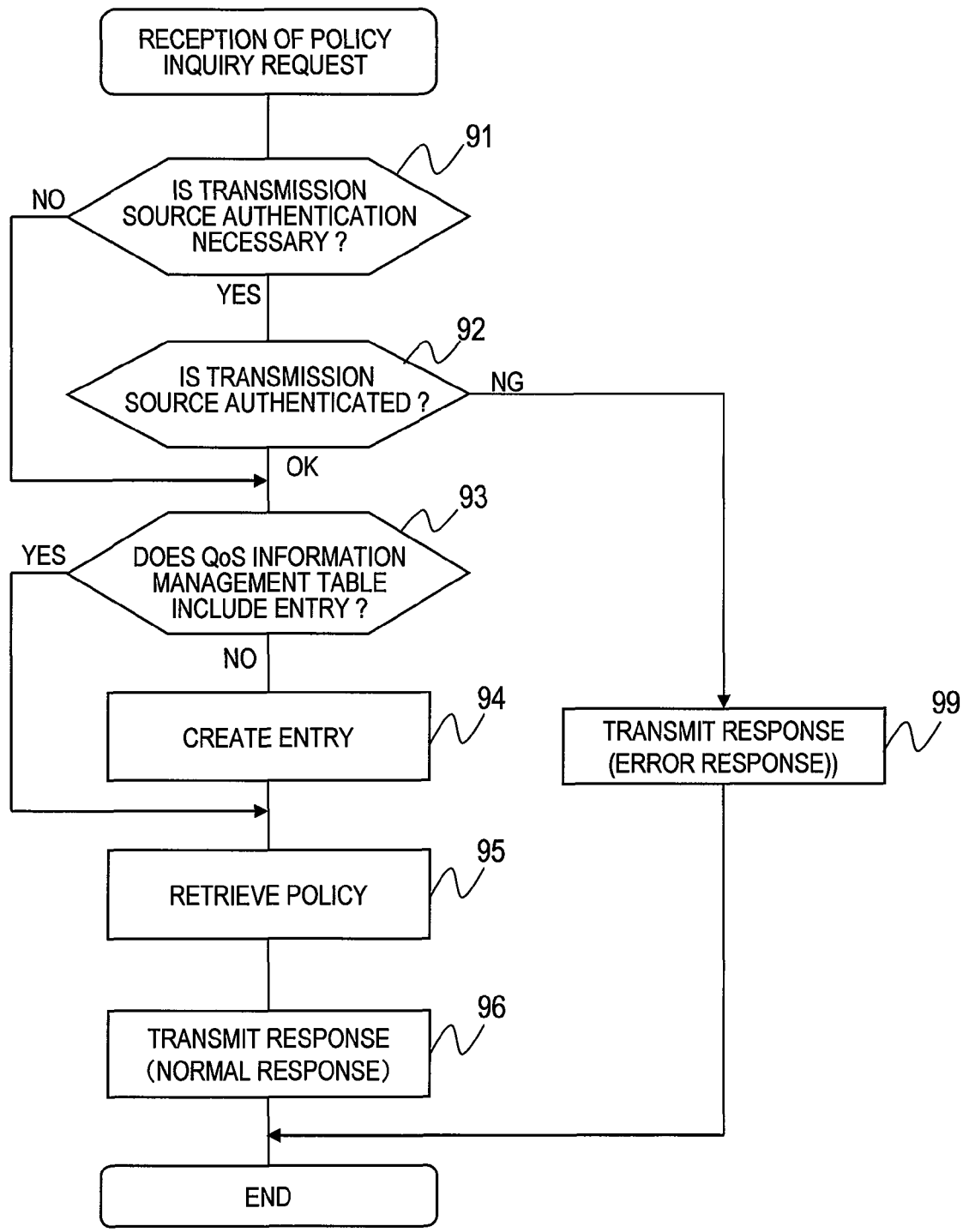
FIG. 9 is a flowchart showing a process executed by a QoS control subprogram in accordance with the first embodiment of this invention.

FIG. 9 is a flowchart of a process to be performed based on the QoS control subprogram 90 according to the first embodiment of this invention.

The QoS control subprogram 90 is executed when the resource control device 8 has received the policy inquiry request message from the control server 4.

First, the resource control device 8 searches the AS information management table 210 by using, as a retrieval key, the address (cnt#4) of the control server 4 which is a transmission source of the policy inquiry request message (91). Specifically, the resource control device 8 retrieves an entry corresponding to the address of the control server 4, and refers to the AS Type 212 of the entry and the Necessity of Authentication 213 thereof.

Next, in the case where it has been determined, according to the Necessity of Authentication 213 thus referred to, that the authentication is necessary, authentication of the transmission source AS 3 is performed (92). On the other hand, in the case where the authentication is unnecessary, the process proceeds to Step 93. In the case where the transmission source AS 3 has been authenticated in Step 92, the process proceeds to Step 93. On the other hand, in the case where the transmission source AS 3 has not been authenticated, the resource control device 8 transmits a response message including an error response, to the control server 4 (99), and terminates the process.

Next, the resource control device 8 searches the QoS information management table 230 by using, as a retrieval key, the Flow ID included in the received message (93). Specifically, in the case where the table includes an entry corresponding to the Flow ID, the process proceeds to Step 95. On the other hand, in the case where the table does not include an entry corresponding to the Flow ID, the process proceeds to Step 94.

Then, the resource control device 8 newly creates an entry (94), by setting, for example, "cnt#4" to the Source IP address 232, and also setting "ue#1" to the Dest. IP address 235. In this case, "cnt#4" corresponds to the IP address of the AS 3 which is a transmission source of the message received by the resource control device 8. Also, "ue#1" corresponds to the user ID included in the received message. Further, the resource control device 8 searches the QoS class table 850 by using, as a retrieval key, the media information included in the received message. The resource control device 8 reads out a QoS class corresponding to the media information, and sets the QoS class to the entry to be created in the QoS information management table 230.

Next, the resource control device 8 reads out an entry corresponding to the Flow ID included in the received message (95).

Then, the resource control device 8 transmits a response message for notifying the control server 4 of normal response (96), and terminates the process.

Here, with reference to FIG. 10, a description will be given of a procedure for providing service by using SIP.

Figure 10:
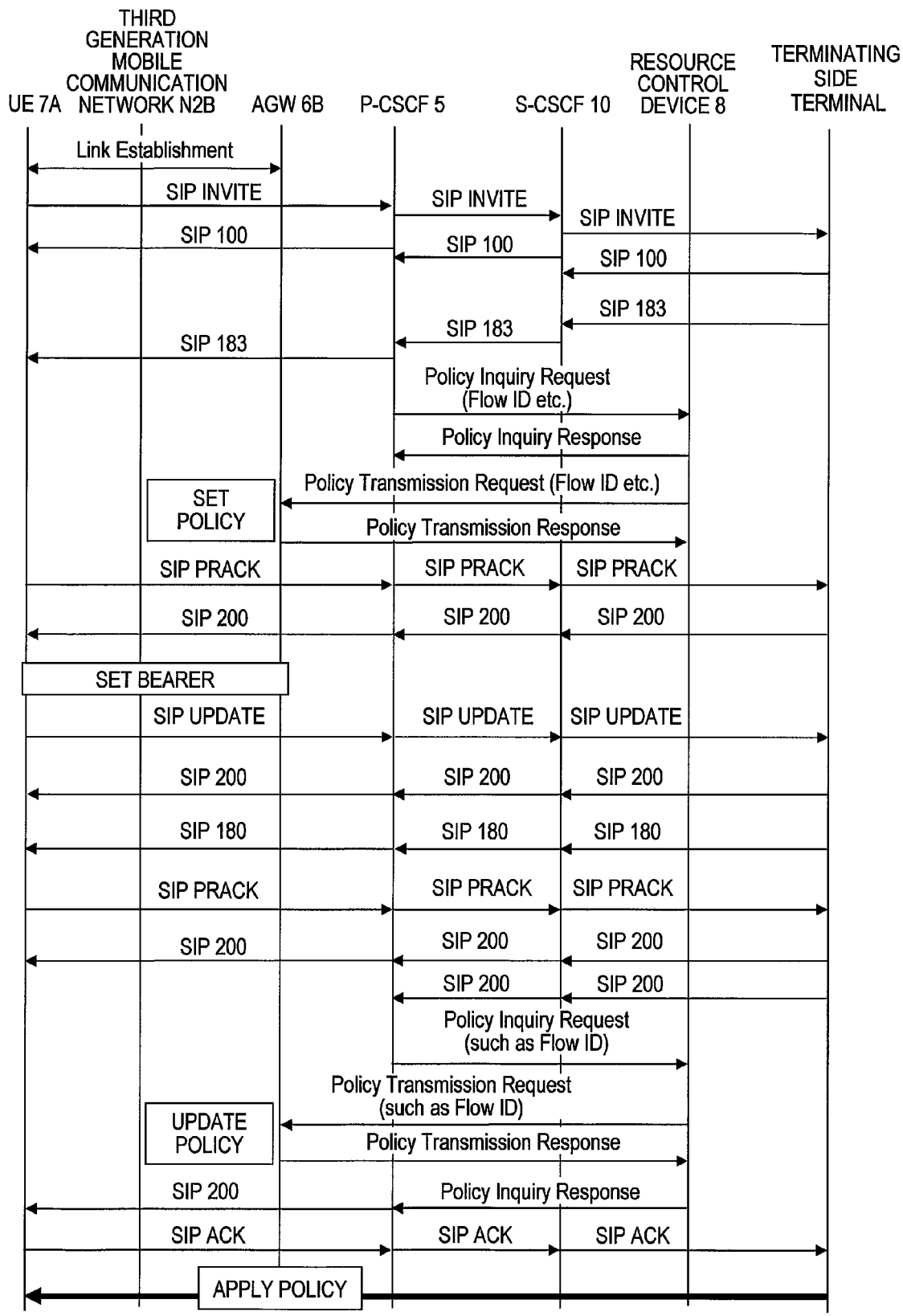
FIG. 10 is a sequence diagram showing an activation procedure for IMS application service.

FIG. 10 is a sequence diagram for illustrating an activation procedure for IMS application service. It should be noted that a detailed description of a procedure to be performed between S-CSCF and a terminating side terminal is omitted.

First, the UE 7A existing on the third generation mobile communication network N2B establishes a link with respect to the AGW 6B, similarly in the activation procedure described with reference to FIG. 7. Next, the UE 7 requests, by using SIP, to establish a session with respect to the terminating side terminal. Further, the P-CSCF 5 transmits a policy inquiry request message to the resource control device 8, in order to set the policy. At this time, similarly in the case of the service activation procedure for non-IMS, the resource control device 8 executes the QoS control service subprogram 90.

In the process related to the QoS control subprogram 90 shown in FIG. 9, the resource control device 8 searches, in Step 91, the AS information management table 210 by using, as a retrieval key, the address of the P-CSCF 5 which is a transmission source of the policy inquiry. Specifically, in the case where the address of the transmission source P-CSCF 5 is "p-cscf#5a", it is identified through the reference that the AS Type 212 is IMS and the Necessity of Authentication 213 is unnecessary.

Next, the process proceeds to Step 93, because it has been determined that the authentication is unnecessary based on the Necessity of Authentication 213 which has been referred to. The process to be performed thereafter is similar to the process performed in the case of non-IMS, except that the destination address of the response message for notifying the normal response in Step 96 is the P-CSCF 5. In other words, in the case where the application server that transmitted the policy inquiry request message is IMS, the destination address of the response message is different from the destination address in the case where the application server is non-IMS.

Next, the AGW 6 sets a policy, and establishes a session. When the session is established, the UE 7A sets a bearer.

Next, the UE 7A establishes a media session by using SDP with respect to the terminating side terminal. Due to the establishment of the media session, the policy settings are updated and a new policy is applied based on the updated content of the policy.

As described above, in the case of receiving service using SIP, the source address of the policy inquiry request message is an IMS application server, and therefore the P-CSCF is set as the destination address of the response message to be transmitted by the resource control device 8. In other words, the resource control device 8 changes the destination address of the response message, depending on the source address of the received policy inquiry request message.

Figure 11:
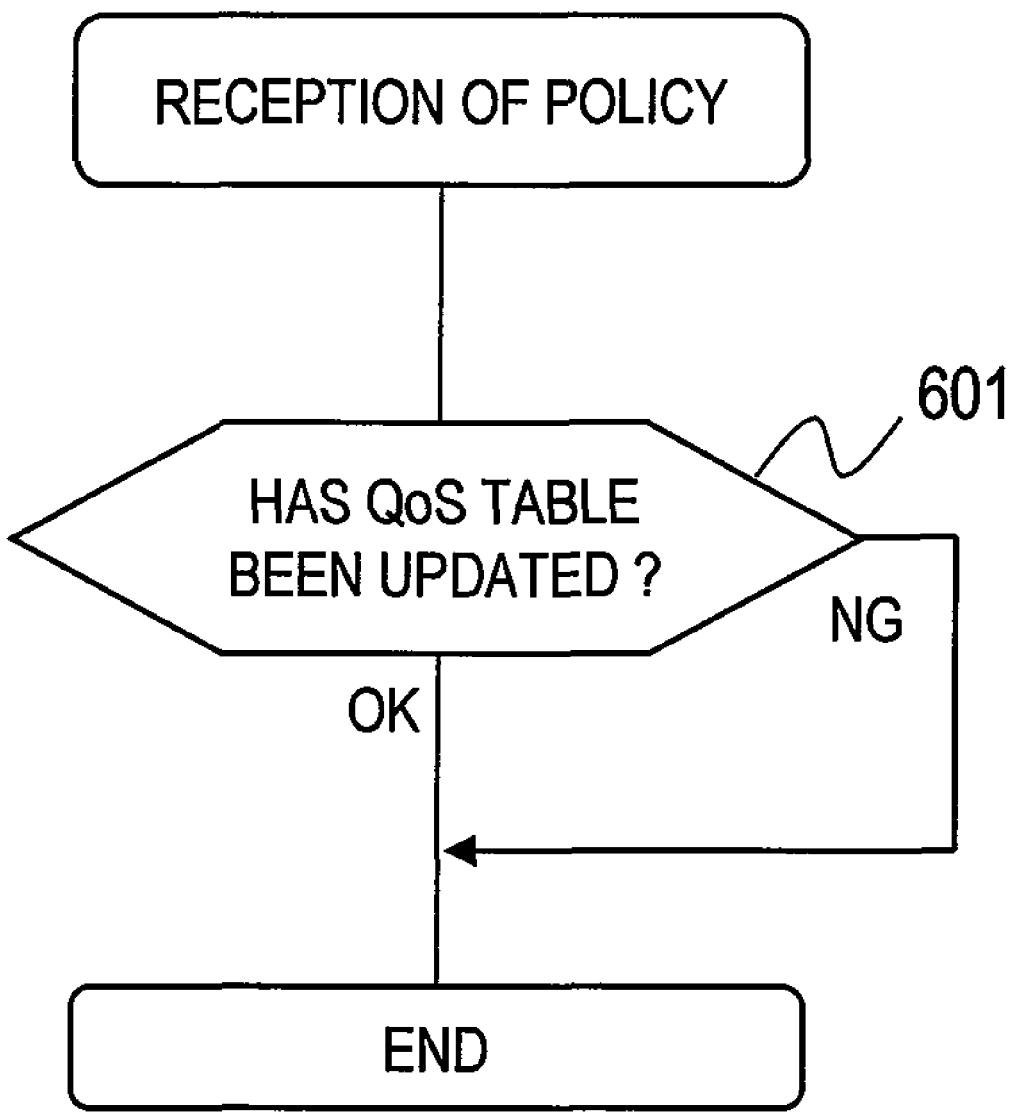
FIG. 11 is a flowchart showing a process executed by a QoS control subprogram in accordance with the first embodiment of this invention.

FIG. 11 is a flowchart of a process to be performed based on the QoS control subprogram 67 according to the first embodiment of this invention.

The QoS control subprogram 67 is executed when the AGW 6 has received a policy transmission response message from the resource control device 8.

First, the AGW 6 searches the QoS information management table 220 by using, as a retrieval key, the Flow ID included in the BCMCS registration request message received from the UE 7A (601). Specifically, in the case where the table does not include an entry corresponding to the Flow ID, a new entry is created, to which values for the Flow ID, the IP address of the source AS3, the port number of the source AS 3, the IP address of destination terminal, the port number of destination terminal, the QoS class, and on or off of the QoS management are respectively set. At this time, information included in the BCMCS registration request message received from the UE 7A is set for the Source IP address 222, the source port number 223, the destination IP address 226, and the destination port number 227. A QoS class included in the policy transmission response received from the resource control device 8 is set as the QoS class 224. Also, on is set to the On/Off 225.

Also, information on the resource control device 8 that transmitted the policy transmission response message is stored in the Resource Control Device 228. Further, the IP address of AS 3, which is a destination address of the Access Request, is stored in the AS Address 229. In a case where the link between the terminal and the AGW 6 is disconnected, it is possible to inform the resource control device 8 and the control server 4 of the AS 3 of the disconnection of the link, because the QoS information management table 220 stores information on the resource control device 8 and on the control server 4.

Then, when the update of the QoS information management table 220 has been completed, the AGW 6 terminates the process.

Next, with reference to FIG. 12, a description will be given of a process to be performed in the case where the UE 7 existing on the third generation mobile communication network N2B has disconnected the link established with respect to the AGW 6B.

Figure 12:
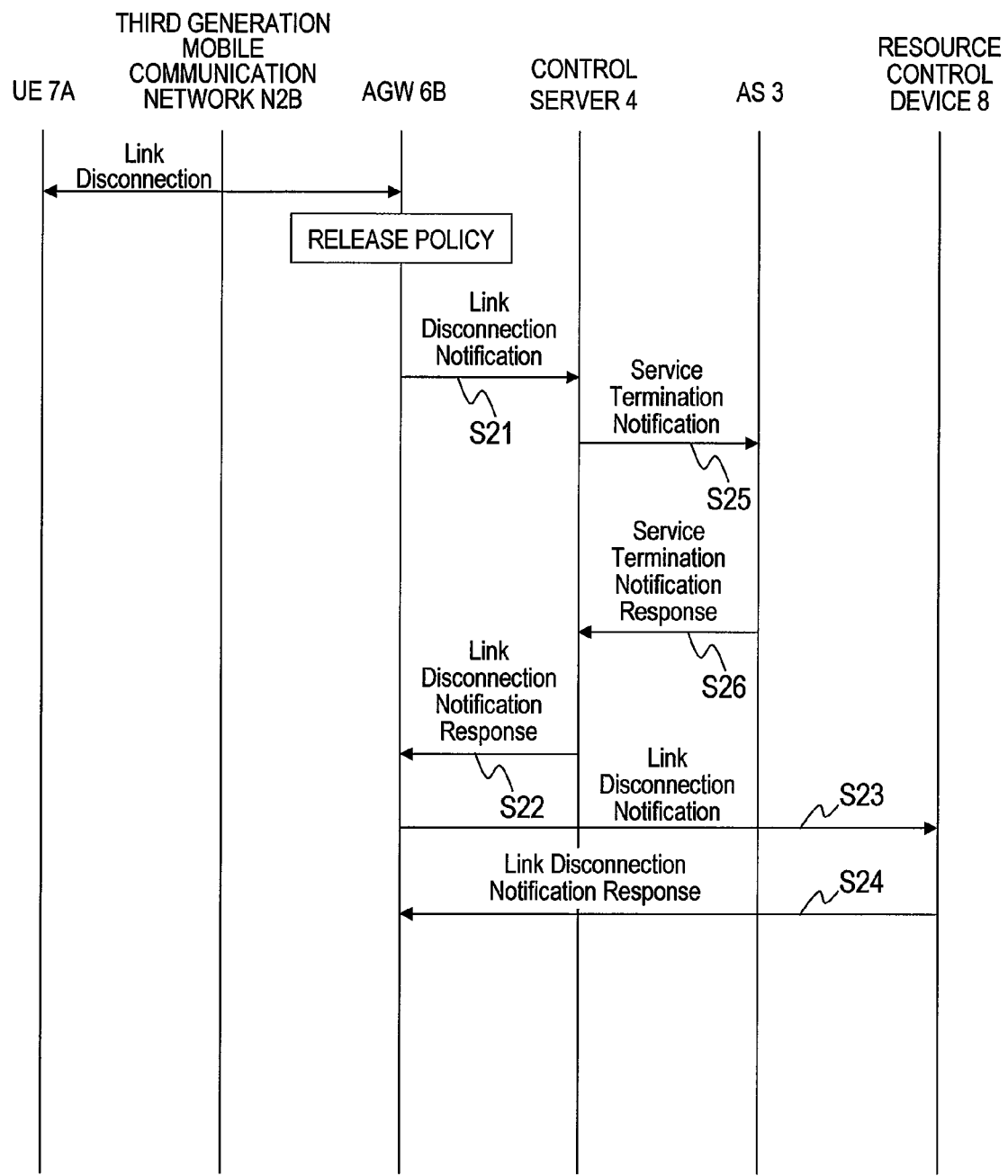
FIG. 12 is a sequence diagram showing a procedure to be performed when the link is disconnected, in accordance with the first embodiment of this invention.

FIG. 12 is a sequence diagram for illustrating a procedure to be performed when the link is disconnected, according to the first embodiment of this invention.

First, the AGW 6, upon detecting the disconnection of the link, searches the QoS information management table 220 by using, as a retrieval key, the Flow ID of the link disconnected. Specifically, the AGW 6 retrieves an entry set by the process based on the QoS control subprogram 67, and reads out address information of the resource control device 8 and address information of the AS 3.

Next, the AGW 6 transmits a signal for notifying the disconnection of the link, to the control server 4 of the AS 3 (S21). Upon receiving the link disconnection notification, the control server 4 transmits the service termination notification to the AS 3 (S25). At this time, the control server 4 deletes, from the service information management table 240, an entry corresponding to the service which has disconnected the link. Then, the control server 4 terminates the resource control process subprogram 400.

Next, the AS 3 transmits the service termination notification response to the control server 4, to thereby notify the completion of the process (S26). Upon receiving the service termination notification response, the control server 4 transmits, to the AGW 6, a response with respect to the link disconnection notification (S22).

Next, the AGW 6 transmits a signal for notifying the link disconnection, to the resource control device 8 (S23). Upon receiving the link disconnection notification, the resource control device 8 deletes, from the QoS information management table 230, an entry corresponding to the service which has disconnected the link. Next, the resource control device 8 transmits, to the AGW 6, a response with respect to the link disconnection notification (S24).

By following the above-mentioned procedure, it is possible to delete information held by the control server 4 and the resource control device 8, in the case where the link between the terminal and the AGW 6 has been disconnected. Accordingly, it is possible to delete unnecessary information from the control server 4 and the resource control device 8, to thereby use the memory with efficiency. Further, it is possible to avoid inconsistency in information among the nodes (the AGW 6, the resource control device 8, and the control server 4) in the system.

According to the first embodiment of this invention, it is possible to perform control (such as bandwidth control, priority control, and control of opening and closing of a port) based on service information, even in a case of providing application service which uses a protocol other than SIP. In other words, in the case of providing non-IMS service, it is possible to perform control based on the service information.

Second Embodiment

Next, a description will be given of a second embodiment of this invention with reference to the accompanying drawings.

According to the first embodiment described above, the control server 4 makes an inquiry about a policy of QoS, with respect to the resource control device 8, and the resource control device 8 transmits a policy rule to the AGW 6, to thereby perform policy control such as priority control and bandwidth control.

On the other hand, in the second embodiment of this invention, the control server 4 according to the first embodiment of this invention does not communicate with the resource control device 8. Instead, the second embodiment of this invention is characterized in that the AGW 6 is provided with a service activation detecting unit for making an inquiry about a policy of QoS with respect to the resource control device 8 upon the service request being authorized, and performing policy control such as priority control and bandwidth control.

The AGW 6, which is provided with the service activation detecting unit, is capable of requesting policy information to the resource control device 8 when a signal with respect to a service request has been received from the control server 4.

The communication network according to the second embodiment of this invention is similar to that of the first embodiment of this invention shown in FIG. 1, and therefore the description thereof will be omitted. In the following, a description will be given only of the points of difference between the second embodiment of this invention and the first embodiment of this invention.

Figure 13:
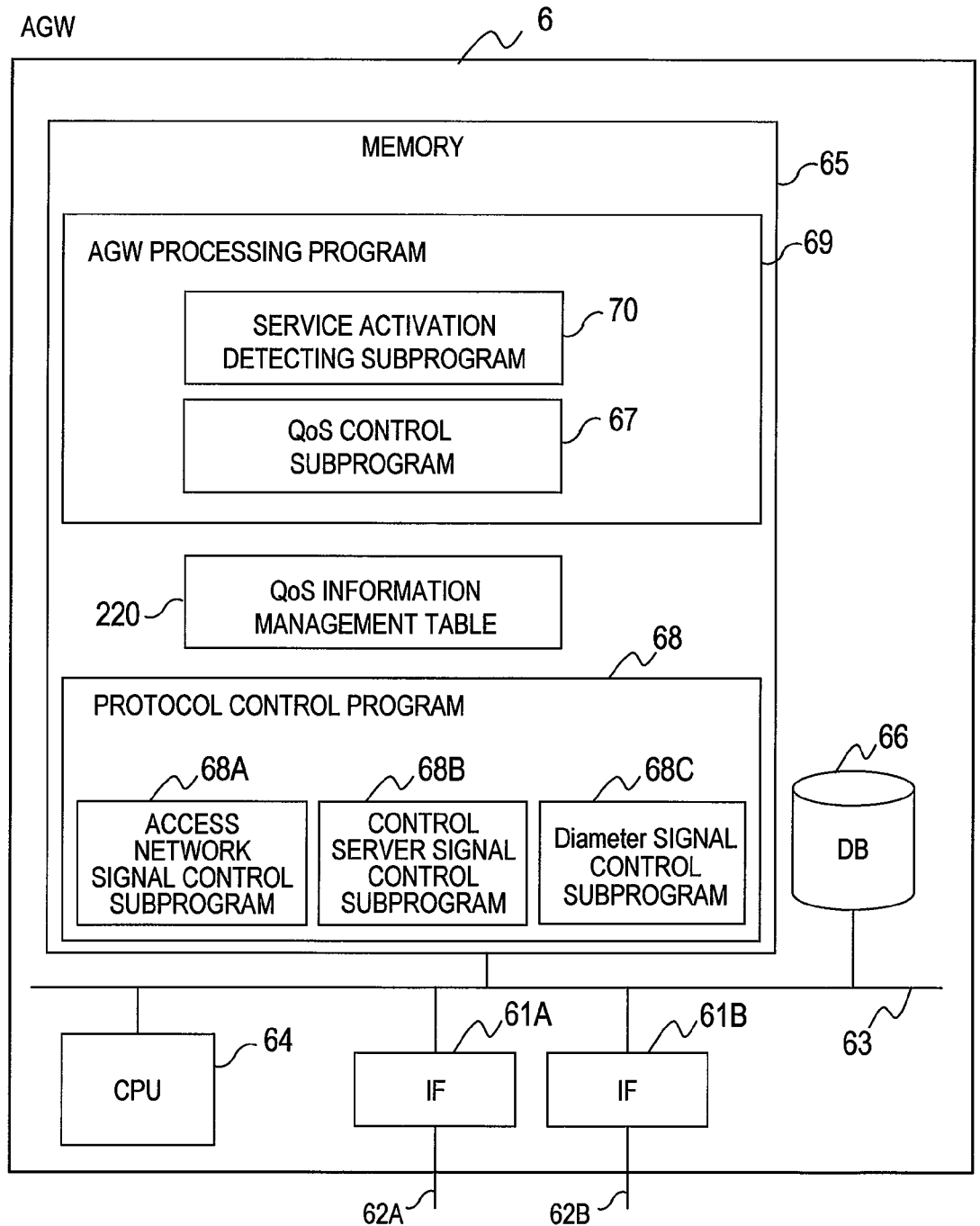
FIG. 13 is a configuration diagram showing an AGW in accordance with a second embodiment of this invention.

FIG. 13 is a configuration diagram of the AGW 6 according to the second embodiment of this invention.

The AGW 6 according to the second embodiment is different from that of the first embodiment of this invention in that the memory 65 includes a service activation detecting subprogram 70.

According to the second embodiment of this invention, the memory 45 of the control server 4 does not include the resource control device message control program 49 and the QoS control program 47. In other words, according to the second embodiment of this invention, it is possible to perform policy control in the AGW 6 without additionally providing a unique function to the control server 4.

Also, according to the second embodiment of this invention, the memory 85 of the resource control device 8 does not include a control server message processing subprogram 32 and the AS information management table 210. Further, the QoS control subprogram 90 in the second embodiment of this invention is executed when a policy transmission request message is received from the AGW 6.

Figure 14:
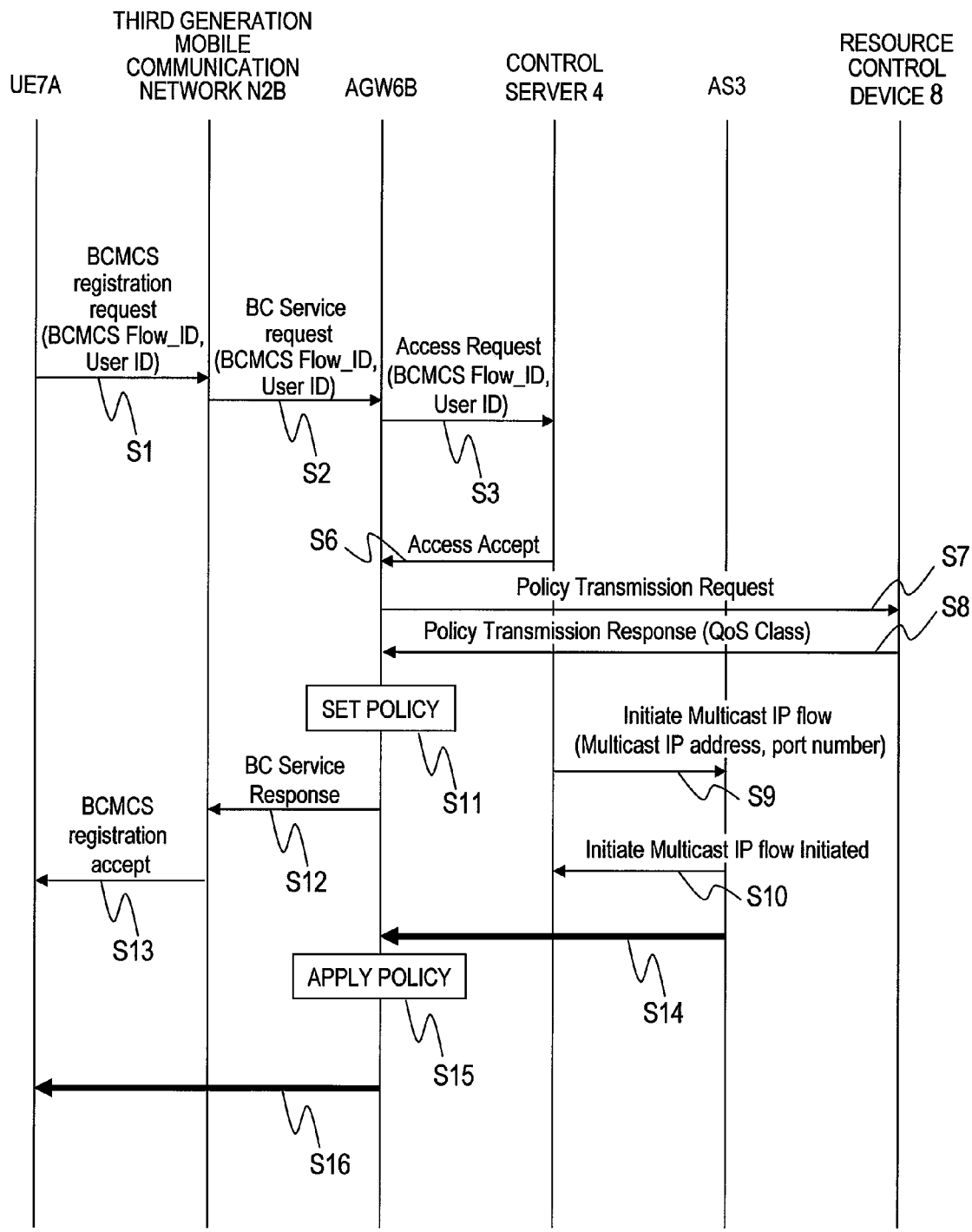
FIG. 14 is a sequence diagram showing a service activation procedure in accordance with the second embodiment of this invention.

Next, with reference to FIG. 14, a description will given of a sequence in which the UE 7A located in the service area of the third generation mobile communication network N2B shown in FIG. 1 makes location registration of BCMCS with AS 3 and executes multicasting service such as news distribution with respect to the AS 3.

FIG. 14 is a sequence diagram for illustrating a service activation procedure according to the second embodiment of this invention.

In the following, of the procedures shown in FIG. 14, the description of the procedures similar to those in FIG. 7 will be omitted.

The second embodiment of this invention is different from the first embodiment of this invention in that the control server 4 does not execute the processes in Steps S4 and S5 of FIG. 7.

The control server 4 according to the second embodiment of this invention transmits, when the Access Request has been received as the BCMCS registration request message, from the AGW 6 in Step S3, a response with respect to the Access Request, to the AGW 6 (S6), without executing the resource control processing subprogram 400 shown in FIG. 8.

Next, the AGW 6 transmits the policy transmission request message to the resource control device 8 (S7). The resource control device 8, upon receiving the policy transmission request message, executes the QoS control subprogram 90.

In the case where it is determined in Step 91 of FIG. 9 that the authentication of the transmission source is necessary, the AGW 6 as the source address of the policy transmission request message is authenticated. Next, the resource control device 8 searches the QoS information management table 230 by using, as a retrieval key, the Flow ID included in the received policy transmission request message (93). In the case where the table includes a corresponding entry, the entry is read out (95). In the case where the table does not include a corresponding entry, a new entry is created, and the IP address of the AGW 6 is set to the Source IP address 232. Also, "ue#1" is set to the Dest. IP address 235 (94). The processes to be performed thereafter are similar to the processes performed based on the QoS control subprogram 90 according to the first embodiment of this invention.

Next, the resource control device 8 transmits a response message with respect to the policy transmission request, to the AGW 6 (S8). The processes to be performed thereafter are similar to the processes in the first embodiment of this invention, which have been described with reference to FIG. 7.

According to the second embodiment of this invention, the access gateway device is provided with a service activation detecting unit, to thereby make it possible to request policy information from the resource control device 8 when a signal is received from the control server 4 in response to a service request. Also, the control server 4, which does not include QoS control program 90, is capable of providing the access gateway device with a policy control function.

According to the second embodiment of this invention, the control server 4 and the AS 3 may be implemented by the same communication device.

Also, in the second embodiment of this invention, the resource control device 8 may be implemented by the same hardware as the AGW 6. Further, the S-CSCF 3, the AS 1, and the HSS 2 may be implemented as the same hardware. Still further, the S-CSCF 3, the I-CSCF 4, and the P-CSCF 5 may be implemented as the same hardware.

Third Embodiment

Next, a description will be given of a third embodiment of this invention with reference to the accompanying drawings.

According to the first embodiment of this invention, the IP network N1 and the non-IMS network N3B are provided by the same network operator. For this reason, a message is directly transmitted and received between the control server 4 and the resource control device 8, or between the AS 3 and the resource control device 8. Meanwhile, the third embodiment of this invention is an example applied to a case where the service is provided across a plurality of operators.

Figure 15:
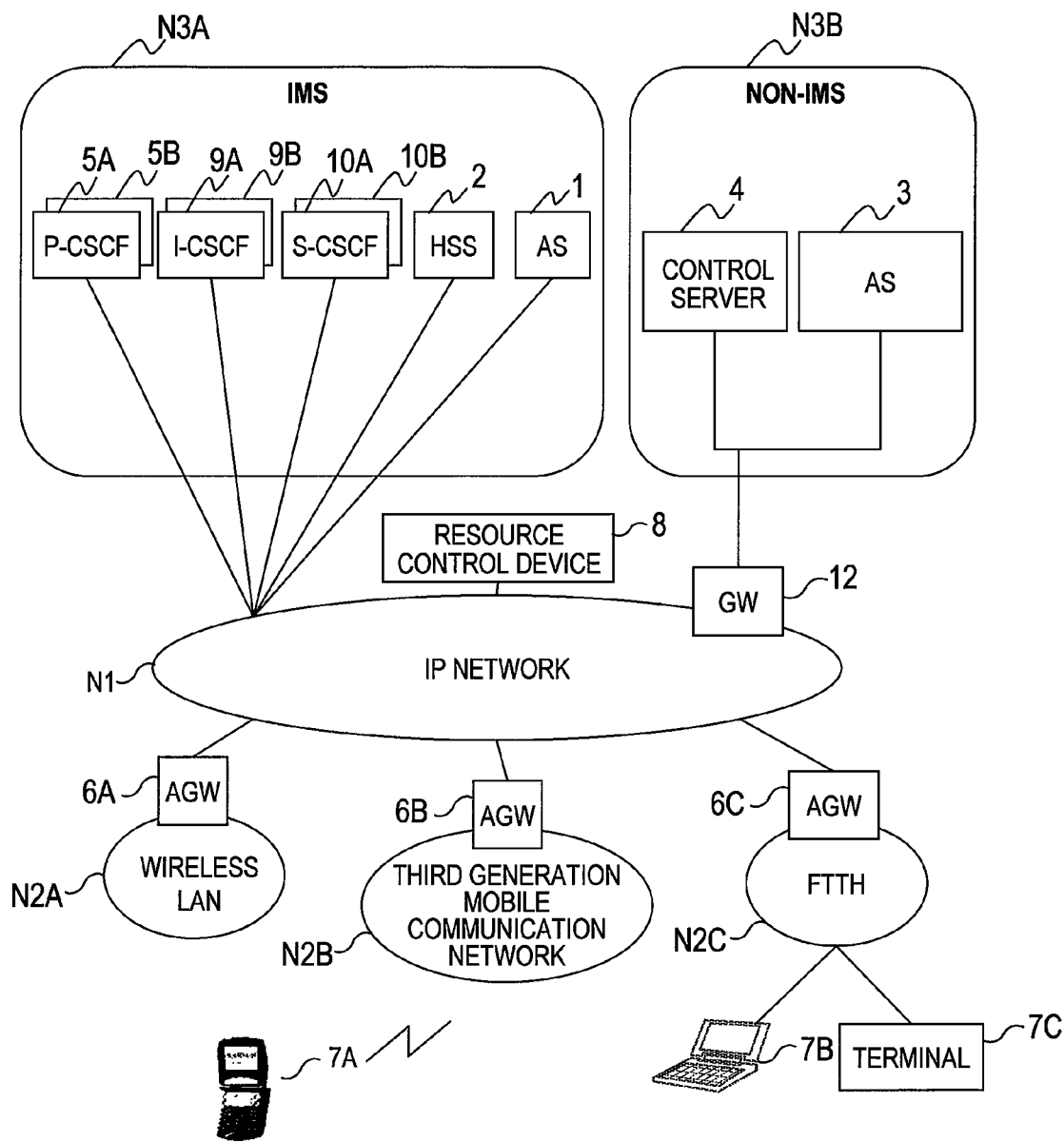
FIG. 15 is a configuration diagram showing a communication network in accordance with the third embodiment of this invention.

FIG. 15 is a configuration diagram of the communication network according to the third embodiment of this invention.

The third embodiment of this invention is different from the first embodiment of this invention in that the IP network N1 and the non-IMS network N3B are provided by different operators.

In the communication network according to the third embodiment of this invention, the IP network N1 and the non-IMS network N3B are connected to each other via a gateway device 12. The gateway device 12 transfers an IP packet transmitted and received between the IP network N1 and the non-IMS network N3B.

The gateway device 12 at least includes, although not shown, an interface connected to the IP network N1, a CPU connected to the interface, and a memory connected to the CPU. The CPU is a processor for executing programs stored in the memory. The memory stores, for example, a processing program such as a firewall and a table necessary for inter-network connection.

According to the third embodiment of this invention, the access gateway device is capable of performing policy control even in a case where the IP network N1 and the non-IMS network N3B are provided by different network operators.

Fourth Embodiment

Next, a description will be given of a fourth embodiment of this invention with reference to the accompanying drawings.

According to the first embodiment of this invention, the IP network designed for a mobile network and the IP network designed for a fixed network are provided by using an integrated IP network. For this reason, the resource control device 8 stores information on various access networks. Meanwhile, the fourth embodiment of this invention may be applied to a case where the IP network designed for a mobile network and the IP network designed for a fixed network are constructed independently of each other. The fourth embodiment of this invention is implemented as an example to be applied to a case where the IP network N1 includes the IP networks N1A and N1B.

Figure 16:
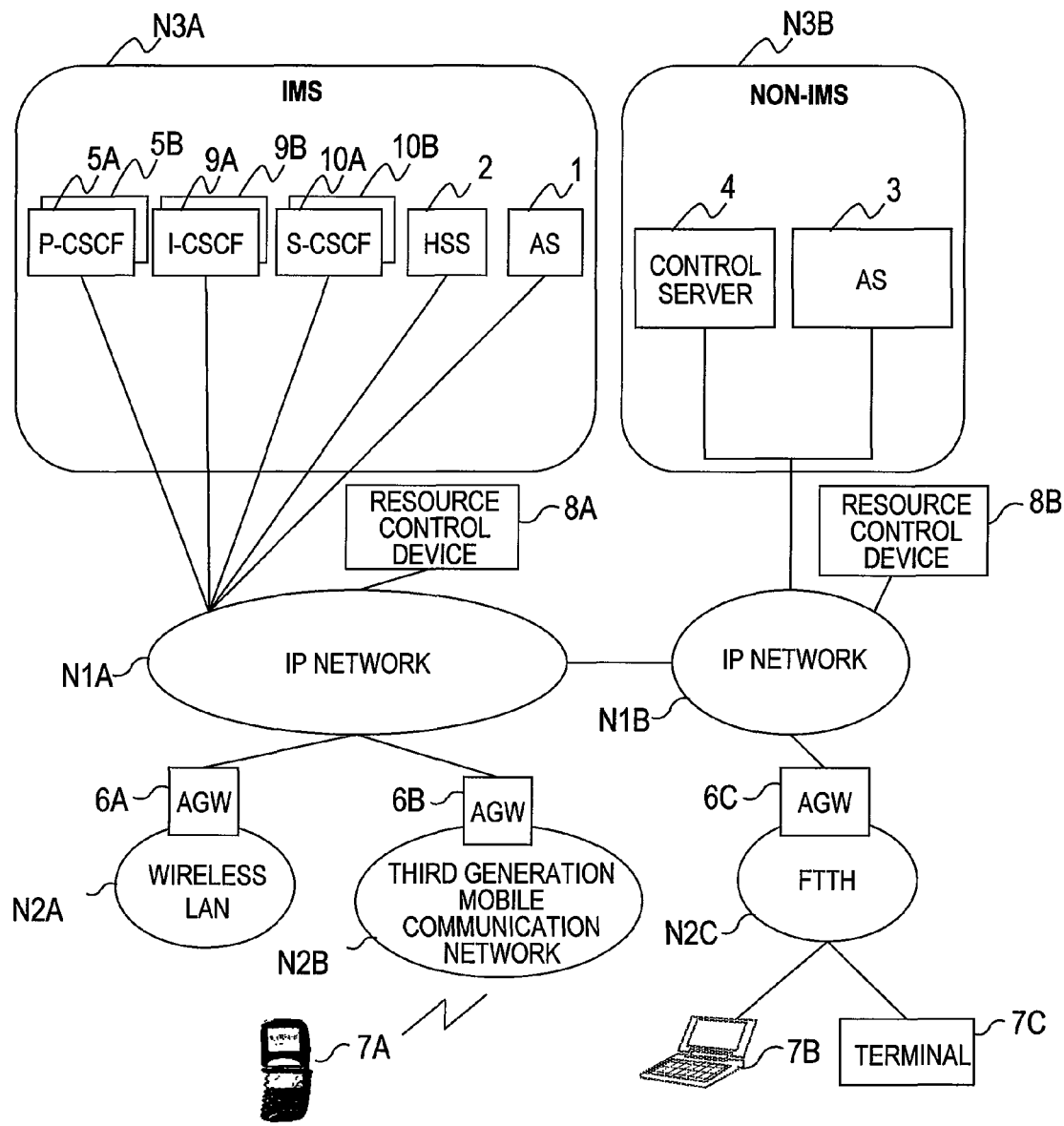
FIG. 16 is a configuration diagram showing a communication network in accordance with the fourth embodiment of this invention.

FIG. 16 is a configuration diagram of a communication network according to the fourth embodiment of this invention.

The fourth embodiment of this invention is different from the first embodiment of this invention in that the IP network N1A and the IP network N1B are alternately connected, and the IP networks N1A and N1B each include a resource control device 8 (8A or 8B), respectively.

The communication network according to the fourth embodiment of this invention, the IP network N1 includes the IP network N1A and the IP network N1B. The IP network N1A has the resource control device 8A connected thereto. The resource control device 8A is provided with a function necessary for performing policy control on the AGW 6 (6A or 6B) connected to the IP network N1A. On the other hand, the IP network N1B has the resource control device 8B connected thereto. The resource control device 8B is provided with a function necessary for performing policy control on the AGW 6C connected to the IP network N1B.

In the case where the policy control is performed on an end-to-end basis, the resource control device 8A and the resource control device 8B may operate in association with each other. When the resource control devices operate in association with each other as described above, the policy information and the resource information in the respective resource control devices are transmitted and received therebetween.

According to the fourth embodiment of this invention, even in the case where the IP network designed for a mobile network and the IP network designed for a fixed network are each formed of an independent IP network and alternately connected, the access gateway device is capable of performing policy control.

While the present invention has been described in detail and pictorially in the accompanying drawings, the present invention is not limited to such detail but covers various obvious modifications and equivalent arrangements, which fall within the purview of the appended claims.

What is claimed is:

1. A communication system comprising:
a plurality of terminal devices;
a gateway device for connecting the plurality of terminal devices to a network;
a first server for receiving a service request from one of the plurality of terminal devices;
a second server for providing service to the one of the plurality of terminal devices; and
a resource control device for providing policy information to be applied to the service provided from the second server:
wherein the first server is configured to manage service control information for associating the service with the policy information, obtain a flow information identifier and a subscriber identifier from a service activation request message received from the one of the plurality of terminal devices, transmit a policy request message including the obtained flow information identifier and the obtained subscriber identifier to the resource control device based on an instruction from the second server, and transmit identification information of the resource control device to the gateway device based on a response message received from the resource control device;
wherein the resource control device is configured to manage resource control information for associating the flow information identifier with the policy information, obtain the flow information identifier and the subscriber identifier from the policy request message transmitted from the first server, retrieve policy information based on the obtained flow information identifier and the obtained subscriber information, the policy information including QoS information to be applied to the service, and transmit the retrieved policy information to the gateway device;
wherein the gateway device is configured to receive the identification information of the resource control device from the first server, receive the policy information from the resource control device corresponding to the received identification information, and set the received policy information with respect to the service; and
wherein the second server is configured to provide the service which has the policy information set thereto, to the one of the plurality of terminal devices.

2. The communication system according to claim 1, wherein the service activation request message includes a control message other than SIP.

3. The communication system according to claim 1, wherein the service activation request message is a message complying with BCMCS and a destination of the service activation request message is the second server.

4. The communication system according to claim 1, wherein the flow information identifier includes a combination of an IP address and a port number of the one of the plurality of terminal devices.

5. The communication system according to claim 1, wherein a source of the policy request message is the second server.

6. The communication system according to claim 1, wherein the resource control device is configured to change a destination of the response message based on the source of the policy request message.

7. The communication system according to claim 1, wherein the gateway device is configured to delete the policy information related to the service when terminating provision of the service.

8. The communication system according to claim 1, wherein the gateway device is configured to instruct the first server to delete the policy information related to the service when terminating provision of the service.

9. The communication system according to claim 1, wherein the gateway device is configured to instruct the resource control device to delete the policy information related to the service when terminating provision of the service.

10. The communication system according to claim 1, wherein the service activation request is a control message for multicasting service.

11. The communication system according to claim 1, wherein the service activation request is a control message for broadcasting service.

12. A communication system, comprising:
a plurality of terminal devices;
a resource control device for providing policy information to be applied to a service;
a gateway device for connecting the plurality of terminal devices to a network;
a first server for receiving a service request from one of the plurality of terminal devices; and
a second server for providing service to the one of the plurality of terminal devices:
wherein the resource control device is configured to manage resource control information for associating a flow information identifier with the policy information, retrieves policy information the policy information including QoS information to be applied to the service based on the flow information identifier received from the gateway device, and transmit the retrieved policy information to the gateway device; and
wherein the gateway device is configured to obtain the flow information identifier of the service from a service activation request message received from the one of the plurality of terminal devices, receive the policy information from the resource control device, based on the obtained flow information identifier, and set the policy information with respect to the service, based on the received policy information.

13. A control server device connected to a network comprising:
an interface connected to the network;
a processor connected to the interface; and
a memory connected to the processor,
wherein the network is connected with a plurality of terminal devices, a gateway device for connecting the plurality of terminal devices to the network, a resource control device for providing policy information to be applied to the network, and a second server for providing service to the plurality of terminal devices,
wherein the memory stores service control information for associating the service with the policy information, and
wherein the processor is configured to obtain a flow information identifier and a subscriber identifier from a service activation request message received from one of the plurality of terminal devices, transmit a policy request message, which includes the obtained flow information identifier and the obtained subscriber identifier, to the resource control device via the interface based on an instruction from the second server, and transmit identification information of the resource control device to the gateway device via the interface based on a response message received from the resource control device.

14. A resource control device connected to a network comprising:
an interface connected to the network;
a processor connected to the interface; and
a memory connected to the processor,
wherein the network is connected with a plurality of terminal devices, a gateway device for connecting the plurality of terminal devices to the network, a first server for receiving a service request from one of the plurality of terminal devices, and a second server for providing service to the one of plurality of terminal devices,
wherein the memory stores resource control information for associating a flow information identifier with policy information, and
wherein the processor is configured to obtain a flow information identifier and a subscriber identifier of the service from a policy request message transmitted from the first server, retrieve policy information including QoS information to be applied to the service based on the obtained flow information identifier and the obtained subscriber identifier, and transmit the retrieved policy information to the gateway device via the interface.

15. A gateway device connected to a network comprising:
an interface connected to the network;
a processor connected to the interface; and
a memory connected to the processor,
wherein the network is connected with a plurality of terminal devices, a resource control device for providing policy information to be applied to a service, a first server for receiving a service request from one of the plurality of terminal devices, and a second server for providing service to the one of the plurality of terminal devices, and
wherein the processor is configured to transmit a service activation request message to the first server via the interface, receive identification information of the resource control device from the first server via the interface, receive the policy information from the resource control device corresponding to the received identification information via the interface, set the received policy information with respect to the service, and control communication information by using the set policy information.

16. A gateway device connected to a network comprising:
an interface connected to the network;
a processor connected to the interface; and
a memory connected to the processor,
wherein the network is connected with a plurality of terminal devices, a resource control device for providing policy information to be applied to a service, a first server for receiving a service request from one of the plurality of terminal devices, and a second server for providing service to the one of the plurality of terminal devices, and
wherein the processor is configured to obtain a flow information identifier of the service from a service activation request message received from one of the plurality of terminal devices, receive the policy information from the resource control device based on the obtained flow information identifier, set the received policy information with respect to the service, and control communication information by using the set policy information.

17. A communication control method executed in a communication system including a plurality of terminal devices, a resource control device for providing policy information to be applied to a service, a gateway device for connecting the plurality of terminal devices to a network, a first server for receiving a service request from one of the plurality of terminal devices, and a second server for providing service to the one of the plurality of terminal devices,
the communication control method comprising the steps of:
managing, by the first server, service control information for associating the service with the policy information;

obtaining, by the first server, a flow information identifier and a subscriber identifier from a service activation request message received from the one of the plurality of terminal devices;

transmitting, by the first server, a policy request message to the resource control device based on the obtained flow information identifier and the obtained subscriber identifier;

transmitting, by the first server, identification information of the resource control device to the gateway device based on a response message received from the resource control device;

managing, by the resource control device, resource control information for associating the flow information identifier with the policy information;

obtaining, by the resource control device, the flow information identifier and the subscriber identifier from the policy request message transmitted from the first server;

retrieving, by the resource control device, policy information based on the obtained flow information identifier and the obtained subscriber information, the policy information including QoS information to be applied to the service;

transmitting, by the resource control device, the retrieved policy information to the gateway device;

receiving, by the gateway device, the identification information of the resource control device from the first server;

receiving, by the gateway device, the policy information from the resource control device corresponding to the received identification information;

setting, by the gateway device, the received policy information with respect to the service, and controlling communication information by using the set policy information; and providing, by the second server, the service which has the policy information set thereto, to the one of the plurality of terminal devices.

18. A communication control method executed in a communication system including a plurality of terminal devices, a resource control device for providing policy information to be applied to a service, a gateway device for connecting the plurality of terminal devices to a network, a first server for receiving a service request from one of the plurality of terminal devices, and a second server for providing service to the one of the plurality of terminal devices, the communication control method comprising the steps of:

managing, by the resource control device, resource control information for associating a flow information identifier with the policy information;

retrieving, by the resource control device, policy information based on the flow information identifier received from the gateway device, the policy information including QoS information to be applied to the service;

transmitting, by the resource control device, the retrieved policy information to the gateway device;

obtaining, by the gateway device, the flow information identifier of the service from a service activation request message received from the one of the plurality of terminal devices;

receiving, by the gateway device, the policy information from the resource control device, based on the obtained flow information identifier;

setting, by the gateway device, the received policy information with respect to the service; and controlling, by the gateway device, communication information by using the set policy information.

* * * * *